(12) United States Patent
Kim et al.

(10) Patent No.: US 9,900,853 B2
(45) Date of Patent: Feb. 20, 2018

(54) METHOD FOR ADDING SECONDARY CELL IN WIRELESS ACCESS SYSTEM SUPPORTING CARRIER AGGREGATION AND APPARATUS FOR SUPPORTING SAME

(71) Applicant: LG ELECTRONICS INC., Seoul (KR)

(72) Inventors: Bonghoe Kim, Seoul (KR); Suckchel Yang, Seoul (KR); Yunjung Yi, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 167 days.

(21) Appl. No.: 14/760,451

(22) PCT Filed: Jan. 22, 2014

(86) PCT No.: PCT/KR2014/000614
§ 371 (c)(1),
(2) Date: Jul. 10, 2015

(87) PCT Pub. No.: WO2014/116018
PCT Pub. Date: Jul. 31, 2014

(65) Prior Publication Data
US 2015/0351061 A1    Dec. 3, 2015

Related U.S. Application Data

(60) Provisional application No. 61/756,444, filed on Jan. 24, 2013.

(51) Int. Cl.
*H04W 56/00* (2009.01)
*H04W 24/08* (2009.01)
(Continued)

(52) U.S. Cl.
CPC ..... *H04W 56/0005* (2013.01); *H04J 11/0053* (2013.01); *H04W 24/08* (2013.01); *H04W 56/00* (2013.01); *H04W 74/0833* (2013.01)

(58) Field of Classification Search
CPC ............ H04W 56/0006; H04W 56/00; H04W 74/0833; H04W 24/08; H04W 74/0891; H04J 11/053
See application file for complete search history.

(56) References Cited

U.S. PATENT DOCUMENTS 8,934,459 B2 * 1/2015 Marinier ................. H04L 5/001
                                                              370/336
9,125,188 B2 * 9/2015 Tamaki .................... H04L 5/001
(Continued)

FOREIGN PATENT DOCUMENTS

CN    101646234 A    2/2010
CN    102036411 A    4/2011
(Continued)

Primary Examiner — Brian O'Connor
(74) Attorney, Agent, or Firm — Birch, Stewart, Kolasch & Birch, LLP

(57) ABSTRACT

The present invention, which is utilized in a wireless access system supporting carrier aggregation (CA), relates to methods for acquiring an uplink synchronization from two or more geographically distanced cells, particularly S-cells, and indicating that the corresponding cell is an S-cell, and to an apparatus for supporting same.

12 Claims, 12 Drawing Sheets

(51) Int. Cl.
*H04W 74/08* (2009.01)
*H04J 11/00* (2006.01)

(56) References Cited

U.S. PATENT DOCUMENTS

| | | | |
|---|---|---|---|
| 9,237,537 B2* | 1/2016 | Dinan | H04W 56/0005 |
| 9,363,797 B2* | 6/2016 | Freda | H04W 72/0406 |
| 2011/0268087 A1 | 11/2011 | Kwon et al. | |
| 2012/0257569 A1 | 10/2012 | Jang et al. | |
| 2013/0064191 A1 | 3/2013 | Jeong et al. | |
| 2013/0343324 A1* | 12/2013 | Lin | H04L 5/001 370/329 |
| 2014/0071920 A1 | 3/2014 | Kamei et al. | |
| 2014/0086213 A1 | 3/2014 | Kwon et al. | |
| 2014/0177555 A1* | 6/2014 | Ng | H04W 72/0406 370/329 |
| 2014/0198748 A1 | 7/2014 | Lee et al. | |
| 2015/0250004 A1 | 9/2015 | Uchino et al. | |

FOREIGN PATENT DOCUMENTS

| | | |
|---|---|---|
| CN | 102083154 A | 6/2011 |
| CN | 102118801 A | 7/2011 |
| EP | 2 122 855 A2 | 10/2009 |
| JP | 2012-9945 A | 1/2012 |
| JP | 2012-70134 A | 4/2012 |
| KR | 10-2011-0082462 A | 7/2011 |
| KR | 10-2012-0136867 A | 12/2012 |
| KR | 10-2013-0008026 A | 1/2013 |
| KR | 10-2013-0009839 A | 1/2013 |
| WO | WO 2011/085200 A1 | 7/2011 |
| WO | WO 2012/039289 A1 | 3/2012 |
| WO | WO 2012/168996 A1 | 12/2012 |
| WO | WO 2012/169840 A2 | 12/2012 |
| WO | WO 2012/177060 A2 | 12/2012 |
| WO | WO 2013/009068 A2 | 1/2013 |
| WO | WO 2014/054722 A1 | 4/2014 |

* cited by examiner

METHOD FOR ADDING SECONDARY CELL IN WIRELESS ACCESS SYSTEM SUPPORTING CARRIER AGGREGATION AND APPARATUS FOR SUPPORTING SAME

CROSS REFERENCE TO RELATED APPLICATIONS

This application is the National Phase of PCT/KR2014/000614 filed on Jan. 22, 2014, which claims priority under 35 U.S.C. 119(e) to U.S. Provisional Application No. 61/756,444 filed on Jan. 24, 2013, all of which are hereby expressly incorporated by reference into the present application.

TECHNICAL FIELD

The present invention relates to a method for adding a secondary cell in a wireless access system supporting carrier aggregation (CA) and an apparatus for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

One object of the present invention is to provide a method for acquiring uplink synchronization in a state that a plurality of cells are aggregated.

Another object of the present invention is to provide a method for acquiring a secondary cell (Scell), which will be newly added in a CA environment, and uplink synchronization.

Still another object of the present invention is to provide a method for acquiring secondary cells, which are geographically spaced apart from one another in a CA environment, and uplink synchronization.

Further still another object of the present invention is to provide a method for indicating that a cell, which is added in a CA environment, is S cell.

Further still another object of the present invention is to provide apparatuses for supporting the aforementioned methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention, which is utilized in a wireless access system supporting carrier aggregation (CA), provides a method for acquiring uplink synchronization from two or more cells geographically spaced apart from one another, particularly S-cells, and a method for indicating that the corresponding cell is an S-cell, and an apparatus for supporting the same.

In one aspect of the present invention, a method for enabling a user equipment to add a secondary (S) cell to carrier aggregation (CA) in a radio access system that supports the CA comprises the steps of receiving S cell information from a primary (P) cell of a first base station, the S cell information including random access channel (RACH) information related to a random access procedure which will be performed by a second base station to be added to the CA and a cell identifier of the second base station; performing the random access procedure for uplink synchronization based on the S cell information in the second base station; and transmitting S cell indication information to the second base station, the S cell indication information indicating that the second base station is the S cell, wherein the S cell indication information includes a cell identifier of the first base station.

The method further comprises the steps of performing a cell measurement for measuring a channel status on neighbor cells; and transmitting a measurement report message to the first base station to report the result of the cell measurement.

In another aspect of the present invention, a user equipment for adding a secondary (S) cell to carrier aggregation (CA) in a radio access system that supports the CA comprises a transmitter; a receiver; and a processor for supporting addition of the S cell.

In this case, the processor may control the receiver to receive S cell information from a primary (P) cell of a first base station, the S cell information including random access channel (RACH) information related to a random access procedure which will be performed by a second base station to be added to the CA and a cell identifier of the second base station, control the transmitter and the receiver to perform the random access procedure for uplink synchronization based on the S cell information in the second base station, and control the transmitter to transmit S cell indication information to the second base station, the S cell indication information indicating that the second base station is the S cell. At this time, the S cell indication information includes a cell identifier of the first base station.

In the above aspects, the RACH information may include resource allocation information indicating a resource region of the second base station in which the random access procedure will be performed, and RACH parameters required to generate RACH preamble which will be used in the random access procedure.

At this time, the second base station may be located at a place geographically spaced apart from the first base station.

Also, the S cell indication information may be transmitted through a scheduling request message.

In still another aspect of the present invention, a method for enabling a first base station to add a secondary (S) cell to carrier aggregation (CA) in a radio access system that supports the CA comprises the steps of receiving a cell measurement report message on neighbor cells from a user equipment; acquiring random access channel (RACH) information related to a random access procedure which will be performed by a second base station of the neighbor cells; transmitting S cell information to the user equipment, the S cell information including a cell identifier of the second base station and the RACH information; receiving an RACH success report message from the user equipment, the RACH success report message indicating that the random access procedure with the second base station has been successfully performed; and transmitting S cell indication information to the second base station, the S cell indication information indicating that the second base station will be operated as the S cell. At this time, the S cell indication information may include a cell identifier of the first base station and UE identifier of the user equipment.

In further still another aspect of the present invention, a first base station for adding a secondary (S) cell to carrier aggregation (CA) in a radio access system that supports the CA may comprise a transmitter; a receiver; and a processor for supporting addition of the S cell.

At this time, the processor of the first base station is configured to receive a cell measurement report message on neighbor cells from a user equipment by using the receiver, acquire random access channel (RACH) information related to a random access procedure which will be performed by a second base station of the neighbor cells, transmit S cell information to the user equipment by using the transmitter, the S cell information including a cell identifier of the second base station and the RACH information, receive an RACH success report message from the user equipment through the receiver, the RACH success report message indicating that the random access procedure with the second base station has been successfully performed, and transmit S cell indication information to the second base station by controlling the transmitter, the S cell indication information indicating that the second base station will be operated as the S cell, wherein the S cell indication information includes a cell identifier of the first base station and UE identifier of the user equipment.

At this time, the RACH information may include resource allocation information indicating a resource region of the second base station in which the random access procedure will be performed, and RACH parameters required to generate RACH preamble which will be used for the random access procedure.

Also, the second base station may be located at a place geographically spaced apart from the first base station.

In further still another aspect of the present invention, the processor may further receive a message, which includes a cell identifier of the second base station and UE identifier, in response to the S cell indication information.

The afore-described aspects of the present invention are merely a part of preferred embodiments of the present invention. Those skilled in the art will derive and understand various embodiments reflecting the technical features of the present invention from the following detailed description of the present invention.

Advantageous Effects

According to the embodiments of the present invention, the following effects can be achieved.

First of all, uplink synchronization may be acquired quickly in a state that a plurality of cells are aggregated.

Second, uplink synchronization with a secondary cell (Scell) which will newly be added in a CA environment may be acquired.

Third, uplink synchronization with S cells, which are geographically spaced apart from one another in a CA environment, may be acquired.

Fourth, S cell indication information for indicating that a cell added to CA is S cell may be transmitted to a second base station, whereby error operation performed by the second base station operated as P cell may be avoided.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention. In the drawings.

BEST MODE FOR CARRYING OUT THE INVENTION

Figure 1:
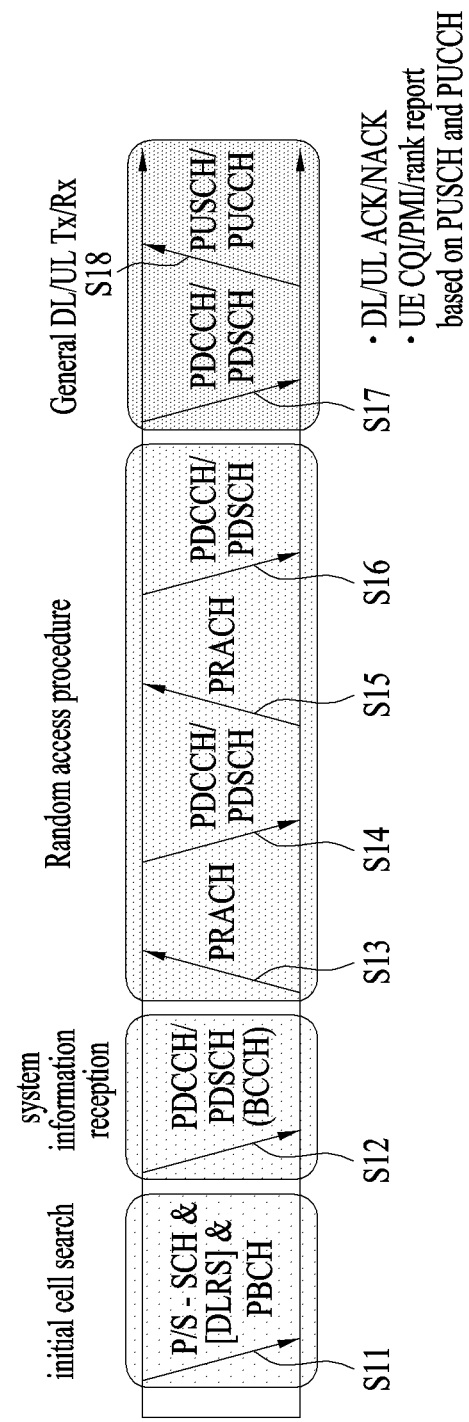
FIG. 1 illustrates physical channels and a general signal transmission method using the physical channels, which may be used in embodiments of the present invention.

Hereinafter, the embodiments of the present invention described in detail, which are utilized in a wireless access system supporting carrier aggregation (CA), provide a method for acquiring uplink synchronization from secondary cells and an apparatus for supporting the same.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

In the embodiments of the present invention, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present invention, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present invention may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present invention may be supported by the standard specifications, 3GPP TS 36.211, 3GPP TS 36.212, 3GPP TS 36.213, and 3GPP TS 36.321. That is, the steps or parts, which are not described to clearly reveal the technical idea of the present invention, in the embodiments of the present invention may be explained by the above standard specifications. All terms used in the embodiments of the present invention may be explained by the standard specifications.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific terms in order to provide a thorough understanding of the present invention. However, it will be apparent to those skilled in the art that the specific terms may be replaced with other terms without departing the technical spirit and scope of the present invention.

For example, the term used in embodiments of the present invention, TA is interchangeable with time advance, timing adjustment, or time adjustment in the same meaning.

The embodiments of the present invention can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present invention are described in the context of a 3GPP LTE/LTE-A system in order to clarify the technical features of the present invention, the present invention is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present invention.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
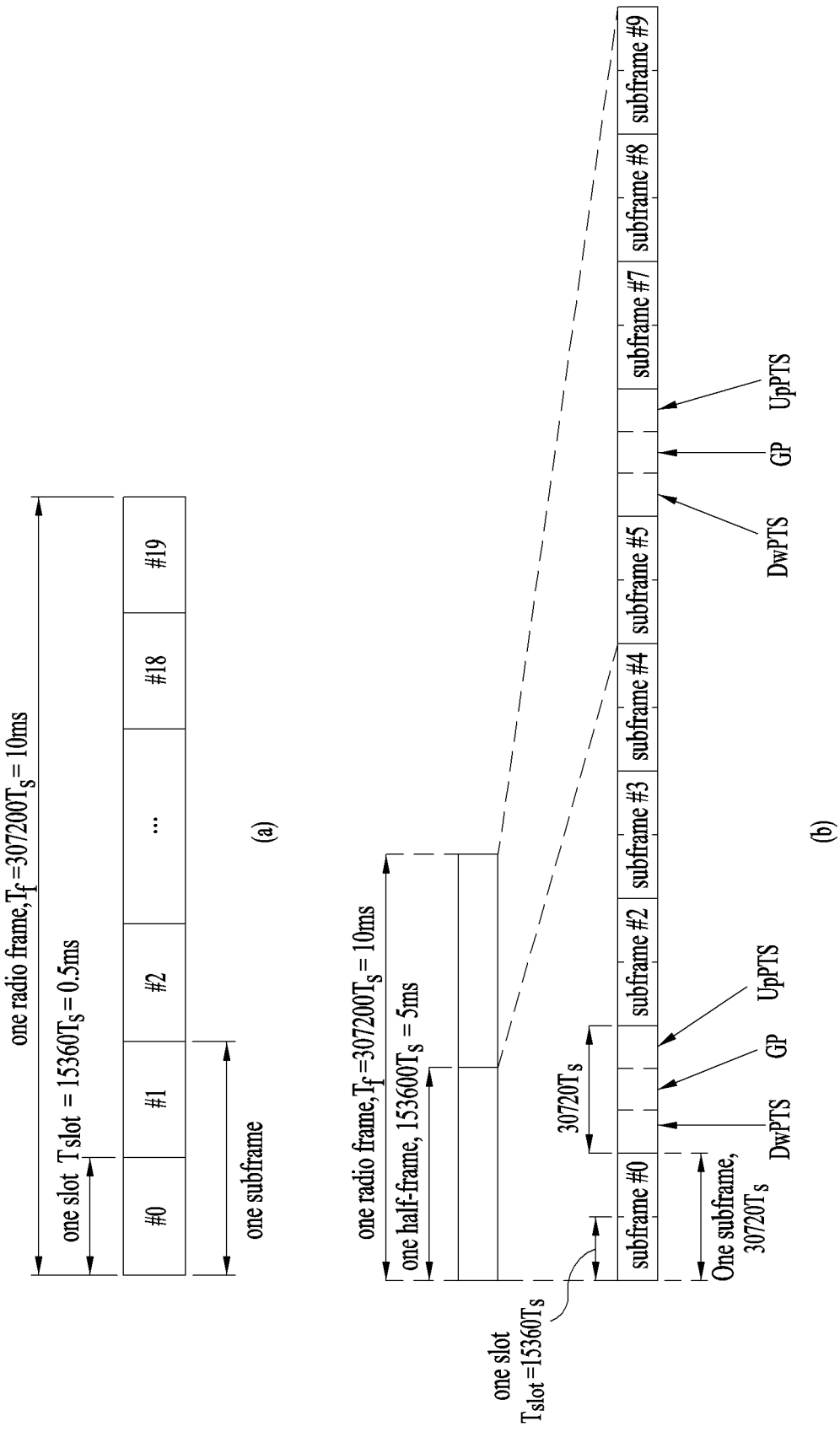
FIG. 2 illustrates radio frame structures used in embodiments of the present invention.

FIG. 2 illustrates exemplary radio frame structures used in embodiments of the present invention.

FIG. 2(a) illustrates frame structure type 1. Frame structure type 1 is applicable to both a full Frequency Division Duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). $T_s$ is a sampling time given as $T_s=1/(15 \text{ kHz} \times 2048)=3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f=307200 \cdot T_s$) long, including two half-frames each having a length of 5 ms ($=53600 \cdot T_s$) long. Each half-frame includes five subframes each being 1 ms ($=30720 \cdot T_s$) long. An subframe includes $2i^{th}$ and $(2i+1)^{th}$ slots each having a length of 0.5 ms ($T_{slot}=15360 \cdot T_s$). $T_s$ is a sampling time given as $T_s=1/(15 \text{ kHz} \times 2048)=3.2552 \times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 3:
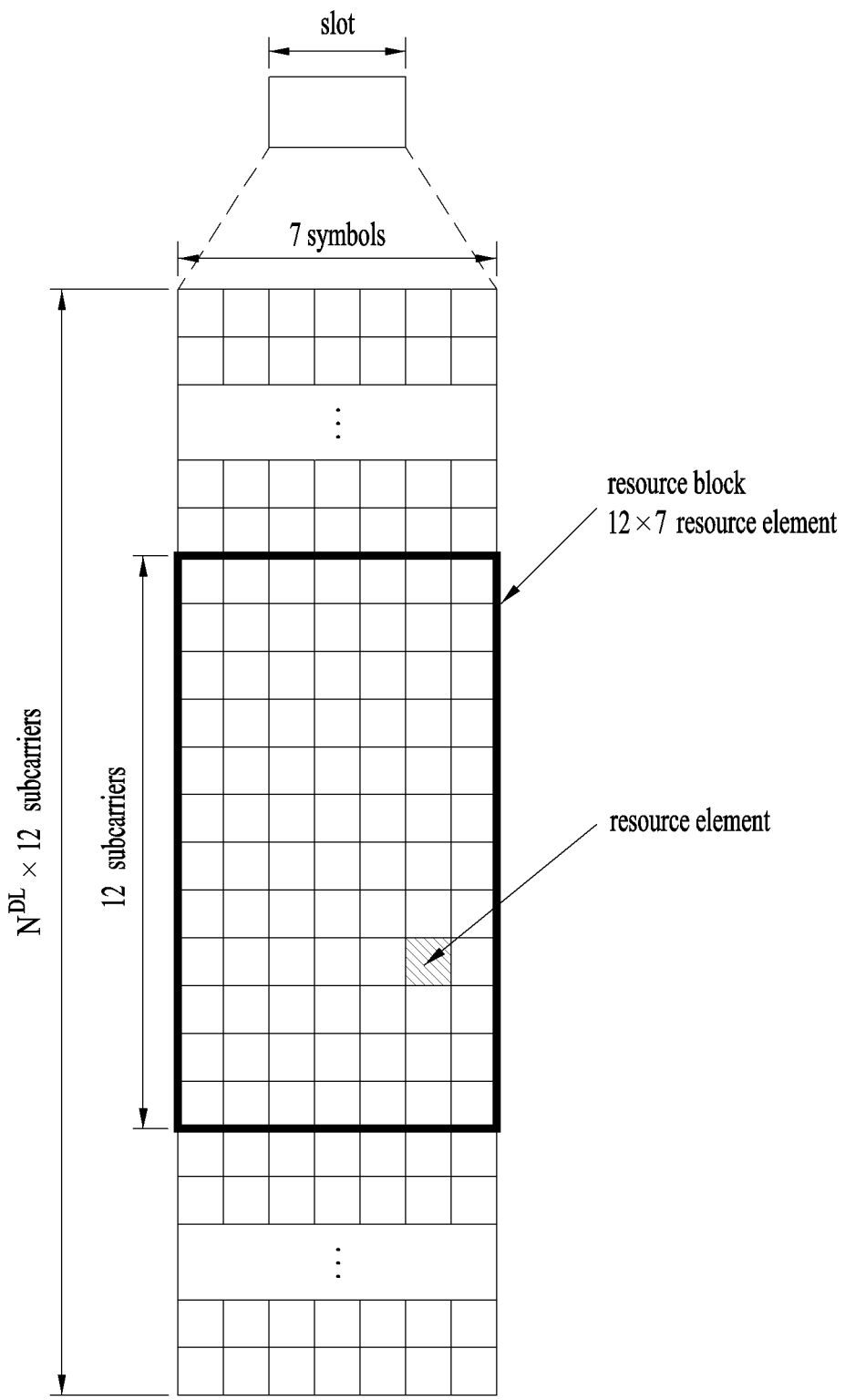
FIG. 3 illustrates a structure of a DownLink (DL) resource grid for the duration of one DL slot, which may be used in embodiments of the present invention.

FIG. 3 illustrates an exemplary structure of a DL resource grid for the duration of one DL slot, which may be used in embodiments of the present invention.

Referring to FIG. 3, a DL slot includes a plurality of OFDM symbols in the time domain. One DL slot includes 7 OFDM symbols in the time domain and an RB includes 12 subcarriers in the frequency domain, to which the present invention is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
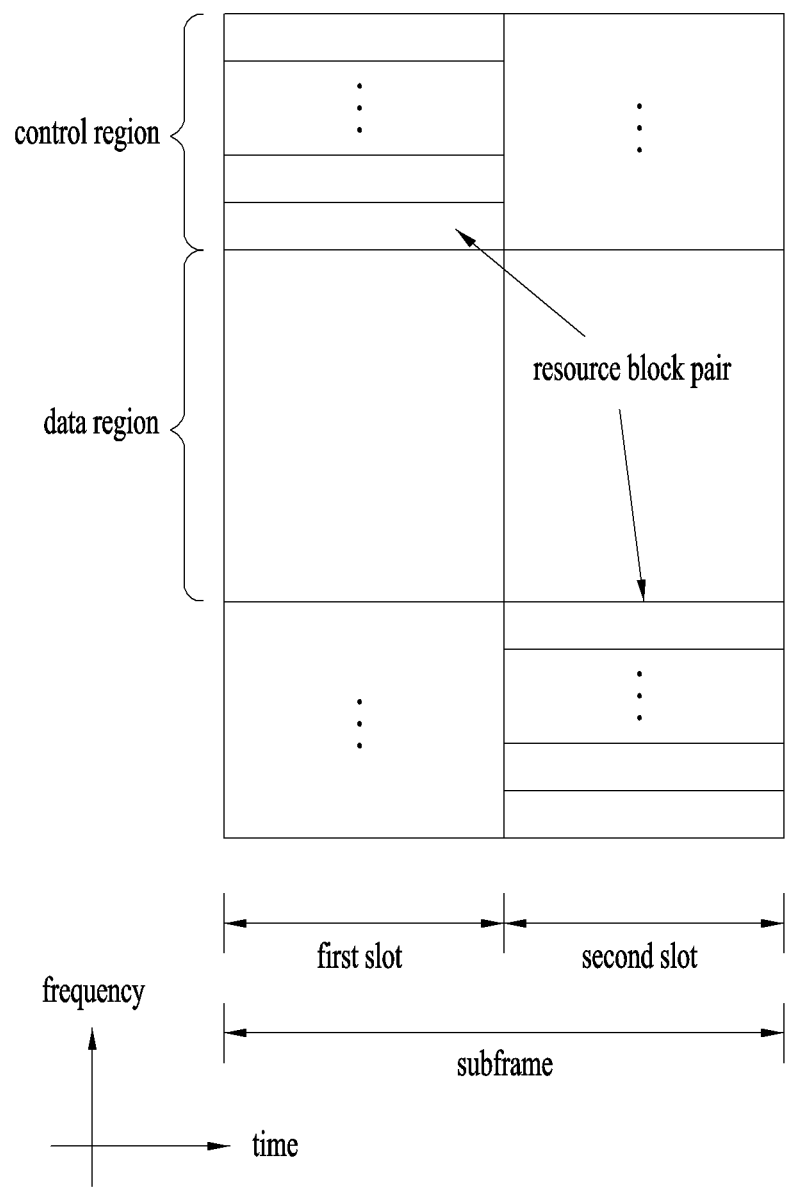
FIG. 4 illustrates a structure of an UpLink (UL) subframe, which may be used in embodiments of the present invention.

FIG. 4 illustrates a structure of a UL subframe which may be used in embodiments of the present invention.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
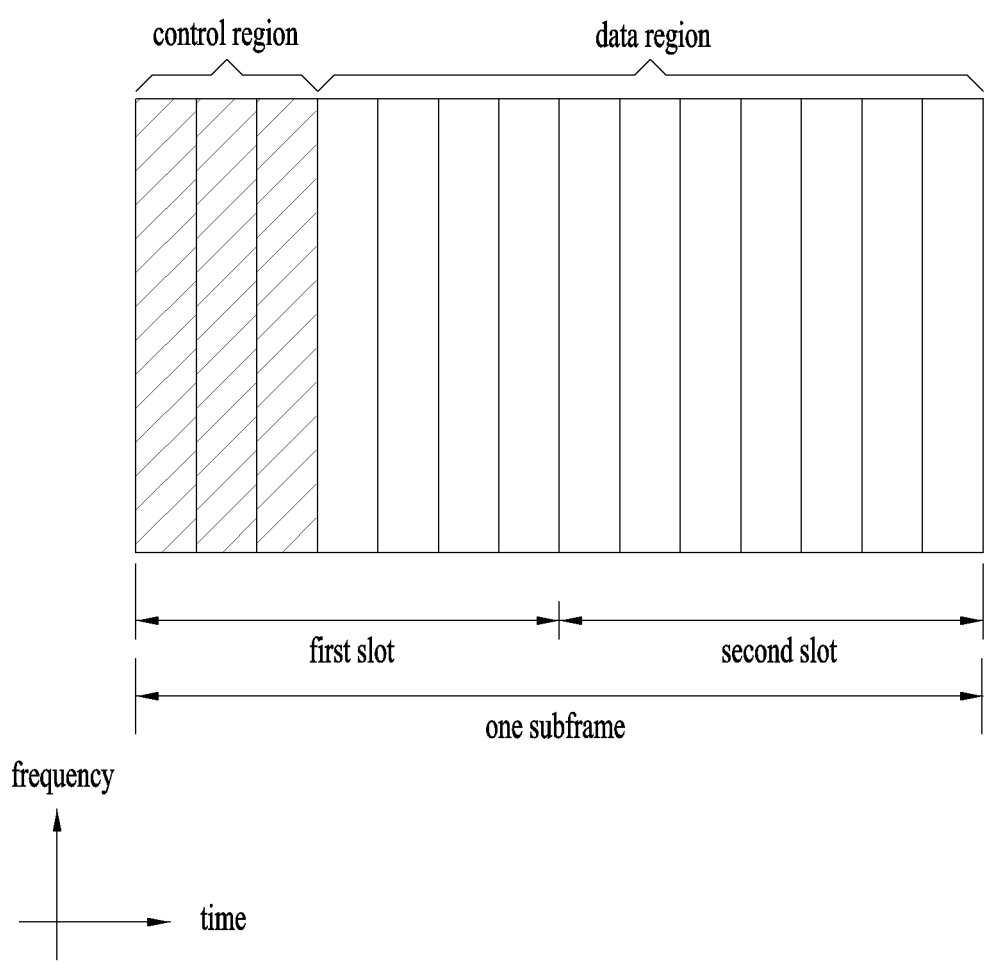
FIG. 5 illustrates a structure of a DL subframe, which may be used in embodiments of the present invention.

FIG. 5 illustrates a structure of a DL subframe that may be used in embodiments of the present invention.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. Carrier Aggregation (CA) Environment 2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present invention, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present invention may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguration message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present invention.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set is preferably defined within the UE DL CC set. That is, the eNB transmits a PDCCH only in the PDCCH monitoring set to schedule a PDSCH or PUSCH for the UE.

Figure 6:
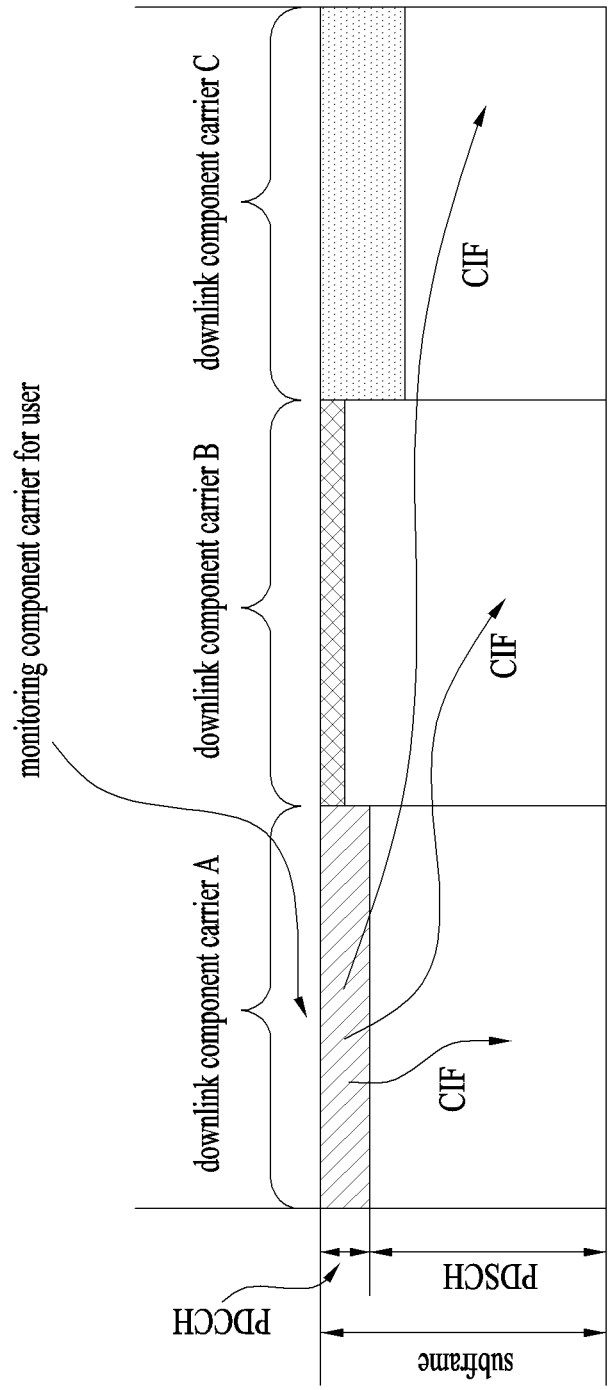
FIG. 6 illustrates a cross carrier-scheduled subframe structure in the LTE-A system, which is used in embodiments of the present invention.

FIG. 6 illustrates a cross carrier-scheduled subframe structure in the LTE-A system, which is used in embodiments of the present invention.

Referring to FIG. 6, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

3. Random Access Procedure 3.1 Contention-Based Random Access Procedure

Figure 7:
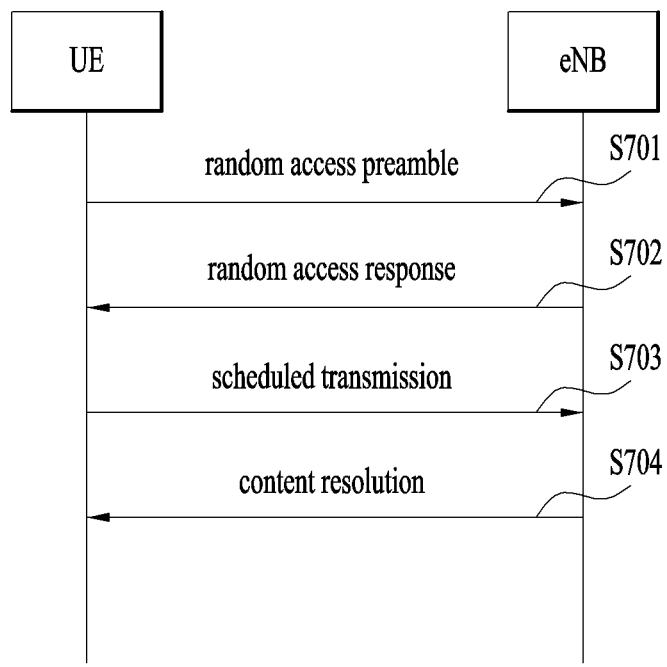
FIG. 7 is a diagram illustrating a signal flow for an operation between a User Equipment (UE) and an evolved Node B (eNB) in a contention-based random access procedure.

FIG. 7 illustrates an operation performed between a UE and an eNB in a contention-based random access procedure.

(1) Transmission of First Message (Msg1)

First, the UE may randomly select a random access preamble from a set of random access preambles indicated by system information or a Handover Command message, select Physical RACH (PRACH) resources, and transmit the selected random access preamble in the PRACH resources to the eNB (S701).

(2) Reception of Second Message (Msg2)

After transmitting the random access preamble in step S701, the UE attempts to receive a random access response within a random access response reception window indicated by the system information or the Handover Command message from the eNB (S702).

Random access response information may be transmitted in a Medium Access Control (MAC) Packet Data Unit (PDU) and the MAC PDU may be transmitted on a PDSCH in step S702. To receive information on the PDSCH successfully, the UE preferably monitors a Physical Downlink Control Channel (PDCCH). The PDCCH may deliver information about a UE to receive the PDSCH, time and frequency information about radio resources of the PDSCH, and information about the transport format of the PDSCH. Once the UE successfully receives the PDCCH directed to it, the UE may appropriately receive a random access response on the PDSCH based on information of the PDCCH. The random access response may include a Random Access Preamble Identifier (RAPID), an UpLink (UL) Grant indicating UL radio resources, a temporary Cell-Radio Network Temporary Identifier (C-RNTI), and a Timing Advance Command (TAC).

The reason for including an RAPID in the random access response is that one random access response may include random access response information for one or more UEs and thus it is necessary to indicate a UE for which the UL Grant, the temporary C-RNTI, and the TAC are valid. Herein, it is assumed that the UE selects an RAPID matching the random access preamble selected by the UE in step S701.

(3) Transmission of Third Message (Msg 3)

If the UE receives a random access response valid for it, the UE processes information included in the random access response. That is, the UE applies the TAC and stores the temporary C-RNTI. In addition, the UE may store data to be transmitted in response to the reception of the valid random access response in an Msg 3 buffer.

Meanwhile, the UE transmits data (i.e., a third message) to the eNB based on the received UL Grant (S703).

The third message should include an ID of the UE. In the contention-based random access procedure, the eNB may not determine which UE is performing the random access procedure and should identify the UE to resolve collision later.

(4) Reception of Fourth Message (Msg 4)

After transmitting the data including its ID based on the UL Grant included in the random access response, the UE awaits reception of a command from the eNB, for contention resolution. That is, the UE attempts to receive a PDCCH, for reception of a specific message (S704).

From the perspective of the physical layer, a Layer 1 (L1) random access procedure refers to transmission and reception of a random access preamble and a random access response in steps S701 and S702. The other messages are transmitted on a shared data channel by a higher layer, which is not considered to fall into the L1 random access procedure.

An RACH is configured to a size of 6 RBs in one or more contiguous subframes reserved for transmission of a random access preamble. The L1 random access procedure is triggered by a preamble transmission request from a higher layer. A preamble index, a target preamble reception power PREAMBLE_RECEIVED_TARGET_POWER, a matching RA-RNTI, and PRACH resources are part of the preamble transmission request, indicated by the higher layer.

Preamble transmission power $P_{PRACH}$ is calculated by [Equation 1].

$$P_{PRACH} \min\{P_{CMAX,c}(i), PREAMBLE\_RECEIVED\_TARGET\_POWER + PL_c\}\_[dBm]$$ [Equation 1]

In [Equation 1], $P_{CMAX,c}(i)$ is transmission power defined for subframe i of a Primacy Cell (PCell) and $PL_c$ is an estimate of a DL pathloss of the PCell for the UE.

A preamble sequence is selected from a preamble sequence set, using a preamble index. A single preamble is transmitted in PRACH resources indicated by the transmission power $P_{PRACH}$ using the selected preamble sequence.

Detection of a PDCCH indicated by the RA-RNTI is attempted within a window controlled by the higher layer. If the PDCCH is detected, a corresponding DL-SCH transport block is transmitted to the higher layer. The higher layer analyzes the transport block and indicates a 20-bit UL Grant.

3.2 Contention-Free Random Access Procedure

Figure 8:
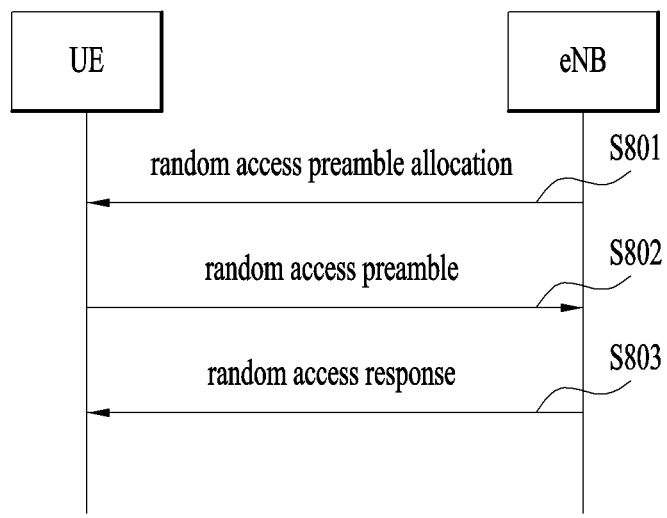
FIG. 8 is a diagram illustrating a signal flow for an operation between a UE and an eNB in a contention-free random access procedure.

FIG. 8 illustrates an operation between a UE and an eNB in a contention-free random access procedure.

Compared to the contention-based random access procedure illustrated in FIG. 8, the contention-free random access procedure ends simply by transmitting the first and second messages. However, before a UE transmits a random access preamble as a first message to an eNB, the eNB allocates the random access preamble to the UE. Then the UE transmits the random access preamble as the first message to the eNB and receives a random access response from the eNB. Thus, the random access procedure ends.

The contention-free random access procedure may be performed in the event of handover or upon request by a command from the eNB. In both cases, the contention-based random access procedure may also be performed.

Referring to FIG. 8, the eNB allocates a dedicated random access preamble that is not likely to collide to the UE, for the contention-free random access procedure. For example, the eNB may indicate the random access preamble to the UE by a Handover Command or a PDCCH order (S801).

The UE transmits the allocated dedicated random access preamble as the first message to the eNB and receives a random access response message in response to the random access preamble from the eNB. Random access response information is received in the same manner as in the contention-based random access procedure illustrated in FIG. 8 (S802 and S803).

3.3 PRACH Preamble

A detailed description will be given of the structure of a PRACH preamble transmitted on an RACH.

Figure 9:
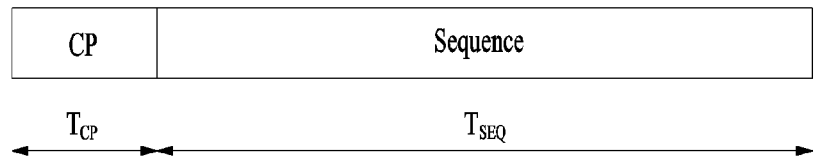
FIG. 9 illustrates an exemplary Physical Random Access Channel (PRACH) preamble that may be used in embodiments of the present invention.

FIG. 9 illustrates an exemplary PRACH preamble that may be used in embodiments of the present invention.

Referring to FIG. 9, the PRACH preamble is divided into a Cyclic Prefix (CP) of length $T_{CP}$ and a sequence of length $T_{SEQ}$. Parameters for the CP and the sequence are determined according to a frame structure and a random access configuration. [Table 2] lists CPs ($T_{CP}$) and sequences ($T_{SEQ}$) for different preamble formats.

TABLE 2

| Preamble format | $T_{CP}$ | $T_{SEQ}$ |
|---|---|---|
| 0 | 3168 · $T_s$ | 24576 · $T_s$ |
| 1 | 21024 · $T_s$ | 24576 · $T_s$ |
| 2 | 6240 · $T_s$ | 2 · 24576 · $T_s$ |
| 3 | 21024 · $T_s$ | 2 · 24576 · $T_s$ |
| 4* | 448 · $T_s$ | 4096 · $T_s$ |

Transmission of a random access preamble is confined to specific time and frequency resources in frame structure type 2 and a specific subframe including a UpTPS. These resources are arranged in an ascending order of subframe numbers in a radio frame, starting from a PRB having the lowest index corresponding to index 0 in a frequency area. PRACH resources within radio resources are indicated by PRACH resource indexes in the order illustrated in [Table 3] and [Table 4].

For frame structure type 1, preamble formats 0 to 3 are used. One random access resource per subframe at maximum is provided. [Table 3] lists subframes carrying allowed random access preambles for the preamble formats listed in [Table 2] and given configurations of frame structure type 1. A PRACH configuration index parameter, prach-ConfigurationIndex is indicated by a higher layer. The start of a random access preamble is adjusted to the start of a UL subframe in which a UE estimates $N_{TA}=0$. $N_{TA}$ is a time offset between a UL radio frame and a DL radio frame.

For PRACH configurations 0, 1, 2, 15, 16, 17, 18, 31, 32, 33, 34, 47, 48, 49, 50, and 63, a UE that will perform handover may estimate the absolute value of a relative time offset of radio frame j between a serving cell and a target cell to be less than $153600 \cdot T_s$. The first PRB $n_{PRB}^{RA}$ allocated to a PRACH opportunity considered for preamble formats 0, 1, 2, and 3 is defined as $n_{PRB}^{RA} = n_{PRB\ offset}^{RA}$ Herein, a PRACH frequency offset parameter, prach-FrequencyOffset $n_{PRBoffset}^{RA}$ is expressed as a PRB number configured by a higher layer, satisfying $0 \leq n_{PRBoffset}^{RA} \leq N_{RB}^{UL} - 6$.

[Table 3] illustrates a mapping relationship among PRACH configuration indexes, preamble formats, system frame numbers, and subframe numbers.

TABLE 3

| PRACH Configuration Index | Preamble Format | System frame number | Subframe number |
| --- | --- | --- | --- |
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |
| 61 | N/A | N/A | N/A |
| 62 | N/A | N/A | N/A |
| 63 | 3 | Even | 9 |

For preamble formats 0 to 4 of frame structure type 2, a plurality of random access resources may exist in a UL frame according to a UL/DL configuration. [Table 4] below illustrates combinations of a preamble format, a PRACH density value $D_{RA}$, and a version index $r_{RA}$ with respect to PRACH configuration indexes available in frame structure type 2. A PRACH configuration index parameter, Prach-ConfigurationIndex is given by a higher layer. For frame structure type 2 of PRACH configurations 0, 1, 2, 20, 21, 22, 30, 31, 32, 40, 41, 42, 48, 49, and 50 or PRACH configurations 51, 53, 54, 55, 56, and 57 in UL/DL configurations 3, 4, and 5, a UE that will perform handover may estimate the absolute value of a relative time offset of radio frame j between a serving cell and a target cell to be less than $153600 \cdot T_s$.

TABLE 4

| PRACH configuration Index | Preamble Format | Density Per 10 ms $D_{RA}$ | Version $r_{RA}$ |
| --- | --- | --- | --- |
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 1 | 0.5 | 0 |
| 21 | 1 | 0.5 | 1 |
| 22 | 1 | 0.5 | 2 |
| 23 | 1 | 1 | 0 |
| 24 | 1 | 1 | 1 |
| 25 | 1 | 2 | 0 |
| 26 | 1 | 3 | 0 |
| 27 | 1 | 4 | 0 |
| 28 | 1 | 5 | 0 |
| 29 | 1 | 6 | 0 |
| 30 | 2 | 0.5 | 0 |
| 31 | 2 | 0.5 | 1 |
| 32 | 2 | 0.5 | 2 |
| 33 | 2 | 1 | 0 |
| 34 | 2 | 1 | 1 |
| 35 | 2 | 2 | 0 |
| 36 | 2 | 3 | 0 |
| 37 | 2 | 4 | 0 |
| 38 | 2 | 5 | 0 |
| 39 | 2 | 6 | 0 |
| 40 | 3 | 0.5 | 0 |
| 41 | 3 | 0.5 | 1 |
| 42 | 3 | 0.5 | 2 |
| 43 | 3 | 1 | 0 |

TABLE 4-continued

| PRACH configuration Index | Preamble Format | Density Per 10 ms $D_{RA}$ | Version $r_{RA}$ |
|---|---|---|---|
| 44 | 3 | 1 | 1 |
| 45 | 3 | 2 | 0 |
| 46 | 3 | 3 | 0 |
| 47 | 3 | 4 | 0 |
| 48 | 4 | 0.5 | 0 |
| 49 | 4 | 0.5 | 1 |
| 50 | 4 | 0.5 | 2 |
| 51 | 4 | 1 | 0 |
| 52 | 4 | 1 | 1 |
| 53 | 4 | 2 | 0 |
| 54 | 4 | 3 | 0 |
| 55 | 4 | 4 | 0 |
| 56 | 4 | 5 | 0 |
| 57 | 4 | 6 | 0 |
| 58 | N/A | N/A | N/A |
| 59 | N/A | N/A | N/A |
| 60 | N/A | N/A | N/A |
| 61 | N/A | N/A | N/A |
| 62 | N/A | N/A | N/A |
| 63 | N/A | N/A | N/A |

[Table 5] below illustrates mapping of physical resources to other random access opportunities needed for a specific PRACH density $D_{RA}$.

TABLE 5

| PRACH configuration Index (표4참조) | UL/DL configuration (See Table 4.2-2) | | | | | | |
|---|---|---|---|---|---|---|---|
| | 0 | 1 | 2 | 3 | 4 | 5 | 6 |
| 0 | (0, 1, 0, 2) | (0, 1, 0, 1) | (0, 1, 0, 0) | (0, 1, 0, 2) | (0, 1, 0, 1) | (0, 1, 0, 0) | (0, 1, 0, 2) |
| 1 | (0, 2, 0, 2) | (0, 2, 0, 1) | (0, 2, 0, 0) | (0, 2, 0, 2) | (0, 2, 0, 1) | (0, 2, 0, 0) | (0, 2, 0, 2) |
| 2 | (0, 1, 1, 2) | (0, 1, 1, 1) | (0, 1, 1, 0) | (0, 1, 0, 1) | (0, 1, 0, 0) | N/A | (0, 1, 1, 1) |
| 3 | (0, 0, 0, 2) | (0, 0, 0, 1) | (0, 0, 0, 0) | (0, 0, 0, 2) | (0, 0, 0, 1) | (0, 0, 0, 0) | (0, 0, 0, 2) |
| 4 | (0, 0, 1, 2) | (0, 0, 1, 1) | (0, 0, 1, 0) | (0, 0, 0, 1) | (0, 0, 0, 0) | N/A | (0, 0, 1, 1) |
| 5 | (0, 0, 0, 1) | (0, 0, 0, 0) | N/A | (0, 0, 0, 0) | N/A | N/A | (0, 0, 0, 1) |
| 6 | (0, 0, 0, 2) (0, 0, 1, 2) | (0, 0, 0, 1) (0, 0, 1, 1) | (0, 0, 0, 0) (0, 0, 1, 0) | (0, 0, 0, 1) (0, 0, 0, 2) | (0, 0, 0, 0) (0, 0, 0, 1) | (0, 0, 0, 0) (1, 0, 0, 0) | (0, 0, 0, 2) (0, 0, 1, 1) |
| 7 | (0, 0, 0, 1) (0, 0, 1, 1) | (0, 0, 0, 0) (0, 0, 1, 0) | N/A | (0, 0, 0, 0) (0, 0, 0, 2) | N/A | N/A | (0, 0, 0, 1) (0, 0, 1, 0) |
| 8 | (0, 0, 0, 0) (0, 0, 1, 0) | N/A | N/A | (0, 0, 0, 0) (0, 0, 0, 1) | N/A | N/A | (0, 0, 0, 0) (0, 0, 1, 1) |
| 9 | (0, 0, 0, 1) (0, 0, 0, 2) (0, 0, 1, 2) | (0, 0, 0, 0) (0, 0, 0, 1) (0, 0, 1, 1) | (0, 0, 0, 0) (0, 0, 1, 0) (1, 0, 0, 0) | (0, 0, 0, 0) (0, 0, 0, 1) (0, 0, 0, 2) | (0, 0, 0, 0) (0, 0, 0, 1) (0, 0, 1, 0) | (0, 0, 0, 0) (1, 0, 0, 0) (2, 0, 0, 0) | (0, 0, 0, 1) (0, 0, 0, 2) (0, 0, 1, 1) |
| 10 | (0, 0, 0, 0) (0, 0, 1, 0) (0, 0, 1, 1) | (0, 0, 0, 1) (0, 0, 1, 0) (0, 0, 1, 1) | (0, 0, 0, 0) (0, 0, 1, 0) (1, 0, 1, 0) | N/A | (0, 0, 0, 0) (0, 0, 0, 1) (1, 0, 0, 0) | N/A | (0, 0, 0, 0) (0, 0, 0, 2) (0, 0, 1, 0) |
| 11 | N/A | (0, 0, 0, 0) (0, 0, 0, 1) (0, 0, 1, 0) | N/A | N/A | N/A | N/A | (0, 0, 0, 1) (0, 0, 1, 0) (0, 0, 1, 1) |
| 12 | (0, 0, 0, 1) (0, 0, 0, 2) (0, 0, 1, 1) (0, 0, 1, 2) | (0, 0, 0, 0) (0, 0, 0, 1) (0, 0, 1, 0) (0, 0, 1, 1) | (0, 0, 0, 0) (0, 0, 1, 0) (1, 0, 0, 0) (1, 0, 1, 0) | (0, 0, 0, 0) (0, 0, 0, 1) (0, 0, 0, 2) (1, 0, 0, 2) | (0, 0, 0, 0) (0, 0, 0, 1) (1, 0, 0, 0) (1, 0, 0, 1) | (0, 0, 0, 0) (1, 0, 0, 0) (2, 0, 0, 0) (3, 0, 0, 0) | (0, 0, 0, 1) (0, 0, 0, 2) (0, 0, 1, 0) (0, 0, 1, 1) |
| 13 | (0, 0, 0, 0) (0, 0, 0, 2) (0, 0, 1, 0) (0, 0, 1, 2) | N/A | N/A | (0, 0, 0, 0) (0, 0, 0, 1) (0, 0, 0, 2) (1, 0, 0, 1) | N/A | N/A | (0, 0, 0, 0) (0, 0, 0, 1) (0, 0, 0, 2) (0, 0, 1, 1) |
| 14 | (0, 0, 0, 0) (0, 0, 0, 1) (0, 0, 1, 0) (0, 0, 1, 1) | N/A | N/A | (0, 0, 0, 0) (0, 0, 0, 1) (0, 0, 0, 2) (1, 0, 0, 0) | N/A | N/A | (0, 0, 0, 0) (0, 0, 0, 2) (0, 0, 1, 0) (0, 0, 1, 1) |
| 15 | (0, 0, 0, 0) (0, 0, 0, 1) (0, 0, 0, 2) (0, 0, 1, 1) (0, 0, 1, 2) | (0, 0, 0, 0) (0, 0, 0, 1) (0, 0, 1, 0) (0, 0, 1, 1) (1, 0, 0, 1) | (0, 0, 0, 0) (0, 0, 1, 0) (1, 0, 0, 0) (1, 0, 1, 0) (2, 0, 0, 0) | (0, 0, 0, 0) (0, 0, 0, 1) (0, 0, 0, 2) (1, 0, 0, 1) (1, 0, 0, 2) | (0, 0, 0, 0) (0, 0, 0, 1) (1, 0, 0, 0) (1, 0, 0, 1) (2, 0, 0, 1) | (0, 0, 0, 0) (1, 0, 0, 0) (2, 0, 0, 0) (3, 0, 0, 0) (4, 0, 0, 0) | (0, 0, 0, 0) (0, 0, 0, 1) (0, 0, 0, 2) (0, 0, 1, 0) (0, 0, 1, 1) |
| 16 | (0, 0, 0, 1) (0, 0, 0, 2) (0, 0, 1, 0) (0, 0, 1, 1) (0, 0, 1, 2) | (0, 0, 0, 0) (0, 0, 0, 1) (0, 0, 1, 0) (0, 0, 1, 1) (1, 0, 1, 1) | (0, 0, 0, 0) (0, 0, 1, 0) (1, 0, 0, 0) (1, 0, 1, 0) (2, 0, 1, 0) | (0, 0, 0, 0) (0, 0, 0, 1) (0, 0, 0, 2) (1, 0, 0, 0) (1, 0, 0, 2) | (0, 0, 0, 0) (0, 0, 0, 1) (1, 0, 0, 0) (1, 0, 0, 1) (2, 0, 0, 0) | N/A | N/A |
| 17 | (0, 0, 0, 0) (0, 0, 0, 1) (0, 0, 0, 2) (0, 0, 1, 0) (0, 0, 1, 2) | (0, 0, 0, 0) (0, 0, 0, 1) (0, 0, 1, 0) (0, 0, 1, 1) (1, 0, 0, 0) | N/A | (0, 0, 0, 0) (0, 0, 0, 1) (0, 0, 0, 2) (1, 0, 0, 0) (1, 0, 0, 1) | N/A | N/A | N/A |
| 18 | (0, 0, 0, 0) (0, 0, 0, 1) (0, 0, 0, 2) (0, 0, 1, 0) (0, 0, 1, 1) (0, 0, 1, 2) | (0, 0, 0, 0) (0, 0, 0, 1) (0, 0, 1, 0) (0, 0, 1, 1) (1, 0, 0, 1) (1, 0, 1, 1) | (0, 0, 0, 0) (0, 0, 1, 0) (1, 0, 0, 0) (1, 0, 1, 0) (2, 0, 0, 0) (2, 0, 1, 0) | (0, 0, 0, 0) (0, 0, 0, 1) (0, 0, 0, 2) (1, 0, 0, 0) (1, 0, 0, 1) (1, 0, 0, 2) | (0, 0, 0, 0) (0, 0, 0, 1) (1, 0, 0, 0) (1, 0, 0, 1) (2, 0, 0, 0) (2, 0, 0, 1) | (0, 0, 0, 0) (1, 0, 0, 0) (2, 0, 0, 0) (3, 0, 0, 0) (4, 0, 0, 0) (5, 0, 0, 0) | (0, 0, 0, 0) (0, 0, 0, 1) (0, 0, 0, 2) (0, 0, 1, 0) (0, 0, 1, 1) (1, 0, 0, 2) |

TABLE 5-continued

| PRACH configuration Index (표4참조) | UL/DL configuration (See Table 4.2-2) | | | | | | |
|---|---|---|---|---|---|---|---|
| | 0 | 1 | 2 | 3 | 4 | 5 | 6 |
| 19 | N/A | (0, 0, 0, 0) | N/A | N/A | N/A | N/A | (0, 0, 0, 0) |
| | | (0, 0, 0, 1) | | | | | (0, 0, 0, 1) |
| | | (0, 0, 1, 0) | | | | | (0, 0, 0, 2) |
| | | (0, 0, 1, 1) | | | | | (0, 0, 1, 0) |
| | | (1, 0, 0, 0) | | | | | (0, 0, 1, 1) |
| | | (1, 0, 1, 0) | | | | | (1, 0, 1, 1) |
| 20/30 | (0, 1, 0, 1) | (0, 1, 0, 0) | N/A | (0, 1, 0, 1) | (0, 1, 0, 0) | N/A | (0, 1, 0, 1) |
| 21/31 | (0, 2, 0, 1) | (0, 2, 0, 0) | N/A | (0, 2, 0, 1) | (0, 2, 0, 0) | N/A | (0, 2, 0, 1) |
| 22/32 | (0, 1, 1, 1) | (0, 1, 1, 0) | N/A | N/A | N/A | N/A | (0, 1, 1, 0) |
| 23/33 | (0, 0, 0, 1) | (0, 0, 0, 0) | N/A | (0, 0, 0, 1) | (0, 0, 0, 0) | N/A | (0, 0, 0, 1) |
| 24/34 | (0, 0, 1, 1) | (0, 0, 1, 0) | N/A | N/A | N/A | N/A | (0, 0, 1, 0) |
| 25/35 | (0, 0, 0, 1) | (0, 0, 0, 0) | N/A | (0, 0, 0, 1) | (0, 0, 0, 0) | N/A | (0, 0, 0, 1) |
| | (0, 0, 1, 1) | (0, 0, 1, 0) | | (1, 0, 0, 1) | (1, 0, 0, 0) | | (0, 0, 1, 0) |
| 26/36 | (0, 0, 0, 1) | (0, 0, 0, 0) | N/A | (0, 0, 0, 1) | (0, 0, 0, 0) | N/A | (0, 0, 0, 1) |
| | (0, 0, 1, 1) | (0, 0, 1, 0) | | (1, 0, 0, 1) | (1, 0, 0, 0) | | (0, 0, 1, 0) |
| | (1, 0, 0, 1) | (1, 0, 0, 0) | | (2, 0, 0, 1) | (2, 0, 0, 0) | | (1, 0, 0, 1) |
| 27/37 | (0, 0, 0, 1) | (0, 0, 0, 0) | N/A | (0, 0, 0, 1) | (0, 0, 0, 0) | N/A | (0, 0, 0, 1) |
| | (0, 0, 1, 1) | (0, 0, 1, 0) | | (1, 0, 0, 1) | (1, 0, 0, 0) | | (0, 0, 1, 0) |
| | (1, 0, 0, 1) | (1, 0, 0, 0) | | (2, 0, 0, 1) | (2, 0, 0, 0) | | (1, 0, 0, 1) |
| | (1, 0, 1, 1) | (1, 0, 1, 0) | | (3, 0, 0, 1) | (3, 0, 0, 0) | | (1, 0, 1, 0) |
| 28/38 | (0, 0, 0, 1) | (0, 0, 0, 0) | N/A | (0, 0, 0, 1) | (0, 0, 0, 0) | N/A | (0, 0, 0, 1) |
| | (0, 0, 1, 1) | (0, 0, 1, 0) | | (1, 0, 0, 1) | (1, 0, 0, 0) | | (0, 0, 1, 0) |
| | (1, 0, 0, 1) | (1, 0, 0, 0) | | (2, 0, 0, 1) | (2, 0, 0, 0) | | (1, 0, 0, 1) |
| | (1, 0, 1, 1) | (1, 0, 1, 0) | | (3, 0, 0, 1) | (3, 0, 0, 0) | | (1, 0, 1, 0) |
| | (2, 0, 0, 1) | (2, 0, 0, 0) | | (4, 0, 0, 1) | (4, 0, 0, 0) | | (2, 0, 0, 1) |
| 29/39 | (0, 0, 0, 1) | (0, 0, 0, 0) | N/A | (0, 0, 0, 1) | (0, 0, 0, 0) | N/A | (0, 0, 0, 1) |
| | (0, 0, 1, 1) | (0, 0, 1, 0) | | (1, 0, 0, 1) | (1, 0, 0, 0) | | (0, 0, 1, 0) |
| | (1, 0, 0, 1) | (1, 0, 0, 0) | | (2, 0, 0, 1) | (2, 0, 0, 0) | | (1, 0, 0, 1) |
| | (1, 0, 1, 1) | (1, 0, 1, 0) | | (3, 0, 0, 1) | (3, 0, 0, 0) | | (1, 0, 1, 0) |
| | (2, 0, 0, 1) | (2, 0, 0, 0) | | (4, 0, 0, 1) | (4, 0, 0, 0) | | (2, 0, 0, 1) |
| | (2, 0, 1, 1) | (2, 0, 1, 0) | | (5, 0, 0, 1) | (5, 0, 0, 0) | | (2, 0, 1, 0) |
| 40 | (0, 1, 0, 0) | N/A | N/A | (0, 1, 0, 0) | N/A | N/A | (0, 1, 0, 0) |
| 41 | (0, 2, 0, 0) | N/A | N/A | (0, 2, 0, 0) | N/A | N/A | (0, 2, 0, 0) |
| 42 | (0, 1, 1, 0) | N/A | N/A | N/A | N/A | N/A | N/A |
| 43 | (0, 0, 0, 0) | N/A | N/A | (0, 0, 0, 0) | N/A | N/A | (0, 0, 0, 0) |
| 44 | (0, 0, 1, 0) | N/A | N/A | N/A | N/A | N/A | N/A |
| 45 | (0, 0, 0, 0) | N/A | N/A | (0, 0, 0, 0) | N/A | N/A | (0, 0, 0, 0) |
| | (0, 0, 1, 0) | | | (1, 0, 0, 0) | | | (1, 0, 0, 0) |
| 46 | (0, 0, 0, 0) | N/A | N/A | (0, 0, 0, 0) | N/A | N/A | (0, 0, 0, 0) |
| | (0, 0, 1, 0) | | | (1, 0, 0, 0) | | | (1, 0, 0, 0) |
| | (1, 0, 0, 0) | | | (2, 0, 0, 0) | | | (2, 0, 0, 0) |
| 47 | (0, 0, 0, 0) | N/A | N/A | (0, 0, 0, 0) | N/A | N/A | (0, 0, 0, 0) |
| | (0, 0, 1, 0) | | | (1, 0, 0, 0) | | | (1, 0, 0, 0) |
| | (1, 0, 0, 0) | | | (2, 0, 0, 0) | | | (2, 0, 0, 0) |
| | (1, 0, 1, 0) | | | (3, 0, 0, 0) | | | (3, 0, 0, 0) |
| 48 | (0, 1, 0, *) | (0, 1, 0, *) | (0, 1, 0, *) | (0, 1, 0, *) | (0, 1, 0, *) | (0, 1, 0, *) | (0, 1, 0, *) |
| 49 | (0, 2, 0, *) | (0, 2, 0, *) | (0, 2, 0, *) | (0, 2, 0, *) | (0, 2, 0, *) | (0, 2, 0, *) | (0, 2, 0, *) |
| 50 | (0, 1, 1, *) | (0, 1, 1, *) | (0, 1, 1, *) | N/A | N/A | N/A | (0, 1, 1, *) |
| 51 | (0, 0, 0, *) | (0, 0, 0, *) | (0, 0, 0, *) | (0, 0, 0, *) | (0, 0, 0, *) | (0, 0, 0, *) | (0, 0, 0, *) |
| 52 | (0, 0, 1, *) | (0, 0, 1, *) | (0, 0, 1, *) | N/A | N/A | N/A | (0, 0, 1, *) |
| 53 | (0, 0, 0, *) | (0, 0, 0, *) | (0, 0, 0, *) | (0, 0, 0, *) | (0, 0, 0, *) | (0, 0, 0, *) | (0, 0, 0, *) |
| | (0, 0, 1, *) | (0, 0, 1, *) | (0, 0, 1, *) | (1, 0, 0, *) | (1, 0, 0, *) | (1, 0, 0, *) | (0, 0, 1, *) |
| 54 | (0, 0, 0, *) | (0, 0, 0, *) | (0, 0, 0, *) | (0, 0, 0, *) | (0, 0, 0, *) | (0, 0, 0, *) | (0, 0, 0, *) |
| | (0, 0, 1, *) | (0, 0, 1, *) | (0, 0, 1, *) | (1, 0, 0, *) | (1, 0, 0, *) | (1, 0, 0, *) | (0, 0, 1, *) |
| | (1, 0, 0, *) | (1, 0, 0, *) | (1, 0, 0, *) | (2, 0, 0, *) | (2, 0, 0, *) | (2, 0, 0, *) | (1, 0, 0, *) |
| 55 | (0, 0, 0, *) | (0, 0, 0, *) | (0, 0, 0, *) | (0, 0, 0, *) | (0, 0, 0, *) | (0, 0, 0, *) | (0, 0, 0, *) |
| | (0, 0, 0, *) | (0, 0, 1, *) | (0, 0, 1, *) | (1, 0, 0, *) | (1, 0, 0, *) | (1, 0, 0, *) | (0, 0, 1, *) |
| | (1, 0, 0, *) | (1, 0, 0, *) | (1, 0, 0, *) | (2, 0, 0, *) | (2, 0, 0, *) | (2, 0, 0, *) | (1, 0, 0, *) |
| | (1, 0, 1, *) | (1, 0, 1, *) | (1, 0, 1, *) | (3, 0, 0, *) | (3, 0, 0, *) | (3, 0, 0, *) | (1, 0, 1, *) |
| 56 | (0, 0, 0, *) | (0, 0, 0, *) | (0, 0, 0, *) | (0, 0, 0, *) | (0, 0, 0, *) | (0, 0, 0, *) | (0, 0, 0, *) |
| | (0, 0, 1, *) | (0, 0, 1, *) | (0, 0, 1, *) | (1, 0, 0, *) | (1, 0, 0, *) | (1, 0, 0, *) | (0, 0, 1, *) |
| | (1, 0, 0, *) | (1, 0, 0, *) | (1, 0, 0, *) | (2, 0, 0, *) | (2, 0, 0, *) | (2, 0, 0, *) | (1, 0, 0, *) |
| | (1, 0, 1, *) | (1, 0, 1, *) | (1, 0, 1, *) | (3, 0, 0, *) | (3, 0, 0, *) | (3, 0, 0, *) | (1, 0, 1, *) |
| | (2, 0, 0, *) | (2, 0, 0, *) | (2, 0, 0, *) | (4, 0, 0, *) | (4, 0, 0, *) | (4, 0, 0, *) | (2, 0, 0, *) |
| 57 | (0, 0, 0, *) | (0, 0, 0, *) | (0, 0, 0, *) | (0, 0, 0, *) | (0, 0, 0, *) | (0, 0, 0, *) | (0, 0, 0, *) |
| | (0, 0, 1, *) | (0, 0, 1, *) | (0, 0, 1, *) | (1, 0, 0, *) | (1, 0, 0, *) | (1, 0, 0, *) | (0, 0, 1, *) |
| | (1, 0, 0, *) | (1, 0, 0, *) | (1, 0, 0, *) | (2, 0, 0, *) | (2, 0, 0, *) | (2, 0, 0, *) | (1, 0, 0, *) |
| | (1, 0, 1, *) | (1, 0, 1, *) | (1, 0, 1, *) | (3, 0, 0, *) | (3, 0, 0, *) | (3, 0, 0, *) | (1, 0, 1, *) |
| | (2, 0, 0, *) | (2, 0, 0, *) | (2, 0, 0, *) | (4, 0, 0, *) | (4, 0, 0, *) | (4, 0, 0, *) | (2, 0, 0, *) |
| | (2, 0, 1, *) | (2, 0, 1, *) | (2, 0, 1, *) | (5, 0, 0, *) | (5, 0, 0, *) | (5, 0, 0, *) | (2, 0, 1, *) |
| 58 | N/A | N/A | N/A | N/A | N/A | N/A | N/A |
| 59 | N/A | N/A | N/A | N/A | N/A | N/A | N/A |
| 60 | N/A | N/A | N/A | N/A | N/A | N/A | N/A |
| 61 | N/A | N/A | N/A | N/A | N/A | N/A | N/A |

TABLE 5-continued

| PRACH configuration Index | UL/DL configuration (See Table 4.2-2) | | | | | | |
|---|---|---|---|---|---|---|---|
| (표4참조) | 0 | 1 | 2 | 3 | 4 | 5 | 6 |
| 62 | N/A | N/A | N/A | N/A | N/A | N/A | N/A |
| 63 | N/A | N/A | N/A | N/A | N/A | N/A | N/A |

In [Table 5], four pairs of each format ($f_{RA}$, $t_{RA}^{(0)}$, $t_{RA}^{(1)}$, $t_{RA}^{(2)}$) indicate the positions of specific random access resources. Herein, $f_{RA}$ indicates a frequency resource index in a considered time instance, $t_{RA}^{(0)}$=0,1,2 indicates whether corresponding resources are (re)generated in all of even-numbered radio frames or odd-numbered radio frames, $t_{RA}^{(1)}$=0,1 indicates whether random access resources are located in the first or second half frame, and $t_{RA}^{(2)}$ indicates the number of a UL subframe in which a preamble starts. UL subframe numbers start to be counted, starting from the first UL subframe between two contiguous DL-UL switch points as 0, and is excluded from preamble format 4. Herein, $t_{RA}^{(2)}$ is expressed as (*).

The start of random access preamble formats 0 to 3 is adjusted to the start of a UL subframe for which a UE estimates $N_{TA}$=0, and random access preamble 4 starts 4832·$T_s$ before the end of a UpPTS. Herein, $N_{TA}$ indicates a time offset between a UL radio frame and a DL radio frame.

If time multiplexing is not sufficient to maintain all opportunities of each PRACH configuration needed for a specific density value $D_{RA}$, the opportunities are allocated to time resources in a time resource-first manner and then to frequency resources. For preamble formats 0 to 3, frequency multiplexing is performed according to [Equation 2].

$$n_{PRB}^{RA} = \begin{cases} n_{PRB\ offset}^{RA} + 6\left\lfloor \frac{f_{RA}}{2} \right\rfloor, & \text{if } f_{RA} \bmod 2 = 0 \\ N_{RB}^{UL} - 6 - n_{PRB\ offset}^{RA} - 6\left\lfloor \frac{f_{RA}}{2} \right\rfloor, & \text{otherwise} \end{cases} \quad \text{[Equation 2]}$$

In [Equation 2], $N_{RB}^{UL}$ represents the number of UL RBs, $n_{PRB}^{RA}$ represents the first PRB allocated to a PRACH opportunity, and $n_{PRBoffset}^{RA}$ represents the first PRB available for a PRACH expressed as the number of PRBs configured by a higher layer, satisfying $0 \leq n_{PRBoffset}^{RA} \leq N_{RB}^{UL} - 6$.

For preamble format 4, frequency multiplexing is performed according to [Equation 3].

In [Equation 3], $n_f$ indicates a system frame number and $N_{SP}$ indicates the number of DL-UL switch points in a radio frame.

For two frame structure types 1 and 2, each radio access preamble has a bandwidth corresponding to 6 contiguous RBs.

3.4 Method for Generating RACH Preamble

Now, a method for generating an RACH preamble will be described below.

A random access preamble (i.e., an RACH preamble) is generated from a Zadoff Chu (ZC) sequence including a Zero Correlation Zone (ZCZ) generated from one or more Root Zadoff Chu (RZC) sequences. A network configures a set of preamble sequences allowed for a UE.

64 preambles are available for each cell. A set of 64 preamble sequences including all possible cyclic shifts of an RZC sequence for a logical index RACH_ROOT_SEQUENCE are searched for in an ascending order of cyclic shifts in the cell. The root index RACH_ROOT_SEQUENCE is broadcast as part of system information. If the 64 preambles are not generated from a single RZC, additional preamble sequences may be acquired from root indexes successive to the corresponding root index until 64 sequences are all detected. The root indexes are cyclically repeated from logical index 0 to logical index 837. For the relationship between logical root sequence indexes and physical root sequence indexes u, refer to [Table 9] and [Table 10] which will be described later.

A $u^{th}$ RZC sequence is defined by [Equation 4].

$$x_u(n) = e^{-j\frac{\pi u n(n+1)}{N_{ZC}}}, \quad 0 \leq n \leq N_{ZC} - 1 \quad \text{[Equation 4]}$$

The length $N_{ZC}$ of a ZC sequence is given in [Table 6]. A random access preamble having a ZCZ of length $N_{CS}$−1, $X_{u,v}(n)$ is defined from the $u^{th}$ RZC sequence using a cyclic shift as expressed in [Equation 5].

$$x_{u,v}(n) = x_u((n+C_v) \bmod N_{ZC}) \quad \text{[Equation 5]}$$

A cyclic shift $C_v$ used in [Equation 5] is given by [Equation 6].

$$n_{PRB}^{RA} = \begin{cases} 6f_{RA}, & \text{if } ((n_f \bmod 2) \times (2 - N_{SP}) + t_{RA}^{(1)}) \bmod 2 = 0 \\ N_{RB}^{UL} - 6(f_{RA} + 1), & \text{otherwise} \end{cases} \quad \text{[Equation 3]}$$

$$C_v = \begin{cases} vN_{CS} & v = 0, 1, \ldots, \left\lfloor \frac{N_{ZC}}{N_{CS}} \right\rfloor - 1 & \text{for unrestricted sets} \\ & N_{CS} \neq 0 \\ 0 & N_{CS} = 0 & \text{for unrestricted sets} \\ d_{start}\left\lfloor \frac{v}{n_{shift}^{RA}} \right\rfloor + (v \bmod n_{shift}^{RA})N_{CS} & v = 0, 1, \ldots, n_{shift}^{RA}n_{group}^{RA} + \bar{n}_{shift}^{RA} - 1 & \text{for restricted sets} \end{cases}$$

[Equation 6]

For preamble formats 0 to 4, $N_{CS}$ is given in [Table 7] and [Table 8]. A ZCZ configuration parameter is provided by a higher layer. A high-speed flag parameter provided by the higher layer indicates whether $C_v$ is selected from a restricted set or an unrestricted set. A parameter $d_u$ indicates a cyclic shift corresponding to a Doppler shift size $1/T_{SEQ}$ having a spacing of one subcarrier, given by the following equation.

$$d_u = \begin{cases} p & 0 \leq p < N_{ZC}/2 \\ N_{ZC} - p & \text{otherwise} \end{cases} \quad \text{[Equation 7]}$$

In [Equation 7], the parameter p is a smallest non-negative integer satisfying (pu)mod $N_{ZC}$=1. A parameter for a restricted set of cyclic shifts depends on $d_u$. If $N_{CS} \leq d_u < N_{ZC}/3$, parameters for the restricted set are given as [Equation 8].

$$n_{shift}^{RA} = \lfloor d_u / N_{CS} \rfloor \quad \text{[Equation 8]}$$
$$d_{start} = 2d_u + n_{shift}^{RA}N_{CS}$$
$$n_{group}^{RA} = \lfloor N_{ZC} / d_{start} \rfloor$$
$$\bar{n}_{shift}^{RA} = \max(\lfloor (N_{ZC} - 2d_u - n_{group}^{RA}d_{start})/N_{CS} \rfloor, 0)$$

If $N_{ZC}/3 \leq d_u \leq (N_{ZC}-N_{CS})/2$, the parameters for the restricted set are given as [Equation 9].

$$n_{shift}^{RA} = \lfloor (N_{ZC}-2d_u)/N_{CS} \rfloor$$
$$d_{start} = N_{ZC}-2d_u + n_{shift}^{RA}N_{CS}$$
$$n_{group}^{RA} = \lfloor d_u/d_{start} \rfloor$$
$$\bar{n}_{shift}^{RA} = \min(\max(\lfloor (d_u - n_{group}^{RA}d_{start})/N_{CS} \rfloor, 0), n_{shift}^{RA}) \quad \text{[Equation 9]}$$

For all other values of $d_u$, no cyclic shift exists in the restricted set. [Table 6] below lists the lengths of a random access preamble sequence for preamble formats.

TABLE 6

| Preamble format | $N_{ZC}$ |
|---|---|
| 0-3 | 839 |
| 4 | 139 |

[Table 7] below illustrates a mapping relationship between ZCZ configurations and cyclic shift values $N_{CS}$ required for generating a random access preamble used in a restricted set or an unrestricted set, for preamble formats 0 to 3. Herein, $N_{CS}$ is the length of a base ZC sequence.

TABLE 7

| zeroCorrelationZoneConfig | $N_{CS}$ value Unrestricted set | $N_{CS}$ value Restricted set |
|---|---|---|
| 0 | 0 | 15 |
| 1 | 13 | 18 |
| 2 | 15 | 22 |
| 3 | 18 | 26 |
| 4 | 22 | 32 |
| 5 | 26 | 38 |
| 6 | 32 | 46 |
| 7 | 38 | 55 |
| 8 | 46 | 68 |
| 9 | 59 | 82 |
| 10 | 76 | 100 |
| 11 | 93 | 128 |
| 12 | 119 | 158 |
| 13 | 167 | 202 |
| 14 | 279 | 237 |
| 15 | 419 | — |

[Table 8] illustrates a mapping relationship between ZCZ configurations used for preamble format 4 and $N_{CS}$ values used for generation of RACH preambles.

TABLE 8

| zeroCorrelationZoneConfig | $N_{CS}$ value |
|---|---|
| 0 | 2 |
| 1 | 4 |
| 2 | 6 |
| 3 | 8 |
| 4 | 10 |
| 5 | 12 |
| 6 | 15 |
| 7 | N/A |
| 8 | N/A |
| 9 | N/A |
| 10 | N/A |
| 11 | N/A |
| 12 | N/A |
| 13 | N/A |
| 14 | N/A |
| 15 | N/A |

[Table 9] lists the orders of root ZC sequences for preamble formats 0 to 3.

TABLE 9

| Logical root sequence number | Physical root sequence number u (in increasing order of the corresponding logical sequence number) |
|---|---|
| 0-23 | 129, 710, 140, 699, 120, 719, 210, 629, 168, 671, 84, 755, 105, 734, 93, 746, 70, 769, 60, 779 2, 837, 1, 838 |
| 24-29 | 56, 783, 112, 727, 148, 691 |
| 30-35 | 80, 759, 42, 797, 40, 799 |
| 36-41 | 35, 804, 73, 766, 146, 693 |
| 42-51 | 31, 808, 28, 811, 30, 809, 27, 812, 29, 810 |
| 52-63 | 24, 815, 48, 791, 68, 771, 74, 765, 178, 661, 136, 703 |
| 64-75 | 86, 753, 78, 761, 43, 796, 39, 800, 20, 819, 21, 818 |
| 76-89 | 95, 744, 202, 637, 190, 649, 181, 658, 137, 702, 125, 714, 151, 688 |
| 90-115 | 217, 622, 128, 711, 142, 697, 122, 717, 203, 636, 118, 721, 110, 729, 89, 750, 103, 736, 61, 778, 55, 784, 15, 824, 14, 825 |
| 116-135 | 12, 827, 23, 816, 34, 805, 37, 802, 46, 793, 207, 632, 179, 660, 145, 694, 130, 709, 223, 616 |
| 136-167 | 228, 611, 227, 612, 132, 707, 133, 706, 143, 696, 135, 704, 161, 678, 201, 638, 173, 666, 106, 733, 83, 756, 91, 748, 66, 773, 53, 786, 10, 829, 9, 830 |
| 168-203 | 7, 832, 8, 831, 16, 823, 47, 792, 64, 775, 57, 782, 104, 735, 101, 738, 108, 731, 208, 631, 184, 655, 197, 642, 191, 648, 121, 718, 141, 698, 149, 690, 216, 623, 218, 621 |
| 204-263 | 152, 687, 144, 695, 134, 705, 138, 701, 199, 640, 162, 677, 176, 663, 119, 720, 158, 681, 164, 675, 174, 665, 171, 668, 170, 669, 87, 752, 169, 670, 88, 751, 107, 732, 81, 758, 82, 757, 100, 739, 98, 741, 71, 768, 59, 780, 65, 774, 50, 789, 49, 790, 26, 813, 17, 822, 13, 826, 6, 833 |
| 264-327 | 5, 834, 33, 806, 51, 788, 75, 764, 99, 740, 96, 743, 97, 742, 166, 673, 172, 667, 175, 664, 187, 652, 163, 676, 185, 654, 200, 639, 114, 725, 189, 650, 115, 724, 194, 645, 195, 644, 192, 647, 182, 657, 157, 682, 156, 683, 211, 628, 154, 685, 123, 716, 139, 700, 212, 627, 153, 686, 213, 626, 215, 624, 150, 689 |
| 328-383 | 225, 614, 224, 615, 221, 618, 220, 619, 127, 712, 147, 692, 124, 715, 193, 646, 205, 634, 206, 633, 116, 723, 160, 679, 186, 653, 167, 672, 79, 760, 85, 754, 77, 762, 92, 747, 58, 781, 62, 777, 69, 770, 54, 785, 36, 803, 32, 807, 25, 814, 18, 821, 11, 828, 4, 835 |
| 384-455 | 3, 836, 19, 820, 22, 817, 41, 798, 38, 801, 44, 795, 52, 787, 45, 794, 63, 776, 67, 772, 72 767, 76, 763, 94, 745, 102, 737, 90, 749, 109, 730, 165, 674, 111, 728, 209, 630, 204, 635, 117, 722, 188, 651, 159, 680, 198, 641, 113, 726, 183, 656, 180, 659, 177, 662, 196, 643, 155, 684, 214, 625, 126, 713, 131, 708, 219, 620, 222, 617, 226, 613 |
| 456-513 | 230, 609, 232, 607, 262, 577, 252, 587, 418, 421, 416, 423, 413, 426, 411, 428, 376, 463, 395, 444, 283, 556, 285, 554, 379, 460, 390, 449, 363, 476, 384, 455, 388, 451, 386, 453, 361, 478, 387, 452, 360, 479, 310, 529, 354, 485, 328, 511, 315, 524, 337, 502, 349, 490, 335, 504, 324, 515 |
| 514-561 | 323, 516, 320, 519, 334, 505, 359, 480, 295, 544, 385, 454, 292, 547, 291, 548, 381, 458, 399, 440, 380, 459, 397, 442, 369, 470, 377, 462, 410, 429, 407, 432, 281, 558, 414, 425, 247, 592, 277, 562, 271, 568, 272, 567, 264, 575, 259, 580 |
| 562-629 | 237, 602, 239, 600, 244, 595, 243, 596, 275, 564, 278, 561, 250, 589, 246, 593, 417, 422, 248, 591, 394, 445, 393, 446, 370, 469, 365, 474, 300, 539, 299, 540, 364, 475, 362, 477, 298, 541, 312, 527, 313, 526, 314, 525, 353, 486, 352, 487, 343, 496, 327, 512, 350, 489, 326, 513, 319, 520, 332, 507, 333, 506, 348, 491, 347, 492, 322, 517 |
| 630-659 | 330, 509, 338, 501, 341, 498, 340, 499, 342, 497, 301, 538, 366, 473, 401, 438, 371, 468, 408, 431, 375, 464, 249, 590, 269, 570, 238, 601, 234, 605 |
| 660-707 | 257, 582, 273, 566, 255, 584, 254, 585, 245, 594, 251, 588, 412, 427, 372, 467, 282, 557, 403, 436, 396, 443, 392, 447, 391, 448, 382, 457, 389, 450, 294, 545, 297, 542, 311, 528, 344, 495, 345, 494, 318, 521, 331, 508, 325, 514, 321, 518 |
| 708-729 | 346, 493, 339, 500, 351, 488, 306, 533, 289, 550, 400, 439, 378, 461, 374, 465, 415, 424, 270, 569, 241, 598 |
| 730-751 | 231, 608, 260, 579, 268, 571, 276, 563, 409, 430, 398, 441, 290, 549, 304, 535, 308, 531, 358, 481, 316, 523 |
| 752-765 | 293, 546, 288, 551, 284, 555, 368, 471, 253, 586, 256, 583, 263, 576 |
| 766-777 | 242, 597, 274, 565, 402, 437, 383, 456, 357, 482, 329, 510 |
| 778-789 | 317, 522, 307, 532, 286, 553, 287, 552, 266, 573, 261, 578 |
| 790-795 | 236, 603, 303, 536, 356, 483 |
| 796-803 | 355, 484, 405, 434, 404, 435, 406, 433 |
| 804-809 | 235, 604, 267, 572, 302, 537 |
| 810-815 | 309, 530, 265, 574, 233, 606 |
| 816-819 | 367, 472, 296, 543 |
| 820-837 | 336, 503, 305, 534, 373, 466, 280, 559, 279, 560, 419, 420, 240, 599, 258, 581, 229, 610 |

[Table 10] lists the order of root ZC sequences for preamble format 4.

TABLE 10

| Logical root sequence number | Physical root sequence number u (in increasing order of the corresponding logical sequence number) | | | | | | | | | | | | | | | | | | | |
|---|---|---|---|---|---|---|---|---|---|---|---|---|---|---|---|---|---|---|---|---|
| 0-19 | 1 | 138 | 2 | 137 | 3 | 136 | 4 | 135 | 5 | 134 | 6 | 133 | 7 | 132 | 8 | 131 | 9 | 130 | 10 | 129 |
| 20-39 | 11 | 128 | 12 | 127 | 13 | 126 | 14 | 125 | 15 | 124 | 16 | 123 | 17 | 122 | 18 | 121 | 19 | 120 | 20 | 119 |
| 40-59 | 21 | 118 | 22 | 117 | 23 | 116 | 24 | 115 | 25 | 114 | 26 | 113 | 27 | 112 | 28 | 111 | 29 | 110 | 30 | 109 |
| 60-79 | 31 | 108 | 32 | 107 | 33 | 106 | 34 | 105 | 35 | 104 | 36 | 103 | 37 | 102 | 38 | 101 | 39 | 100 | 40 | 99 |
| 80-99 | 41 | 98 | 42 | 97 | 43 | 96 | 44 | 95 | 45 | 94 | 46 | 93 | 47 | 92 | 48 | 91 | 49 | 90 | 50 | 89 |

TABLE 10-continued

| Logical root sequence number | Physical root sequence number u (in increasing order of the corresponding logical sequence number) | | | | | | | | | | | | | | | | | | |
|---|---|---|---|---|---|---|---|---|---|---|---|---|---|---|---|---|---|---|---|
| 100-119 | 51 | 88 | 52 | 87 | 53 | 86 | 54 | 85 | 55 | 84 | 56 | 83 | 57 | 82 | 58 | 81 | 59 | 80 | 60 | 79 |
| 120-137 | 61 | 78 | 62 | 77 | 63 | 76 | 64 | 75 | 65 | 74 | 66 | 73 | 67 | 72 | 68 | 71 | 69 | 70 | — | — |
| 138-837 | N/A | | | | | | | | | | | | | | | | | | |

3.5 PRACH Parameters

Parameters required to generate a PRACH preamble will be described below.

The PRACH parameters are indicated to a UE by higher-layer signaling (e.g., RRC signaling or MAC signaling). For example, a PRACH-ConfigSIB Information Element (IE) and a PRACH-Config IE are used to explicitly indicate a PRACH configuration (i.e. PRACH parameters) in system information and mobility control information. Particularly, the PRACH-Config IE is transmitted in System Information Block 2 (SIB2). [Table 11] illustrates an example of the PRACH-Config IE.

TABLE 11

```
-- ASN1START
PRACH-ConfigSIB ::=              SEQUENCE {
    rootSequenceIndex                INTEGER (0..837),
    prach-ConfigInfo                 PRACH-ConfigInfo
}
PRACH-Config ::=                 SEQUENCE {
    rootSequenceIndex                INTEGER (0..837),
    prach-ConfigInfo                 PRACH-ConfigInfo
                            OPTIONAL -- Need ON
}
PRACH-ConfigSCell-r10 ::=        SEQUENCE {
    prach-ConfigIndex-r10            INTEGER (0..63)
}
PRACH-ConfigInfo ::=             SEQUENCE {
    prach-ConfigIndex                INTEGER (0..63),
    highSpeedFlag                    BOOLEAN,
    zeroCorrelationZoneConfig        INTEGER (0..15),
    prach-FreqOffset                 INTEGER (0..94)
}
-- ASN1STOP
```

In [Table 11], a highSpeedFlag parameter indicates whether cyclic shifts used for generation of RACH preambles are from a restricted set or an unrestricted set. A Prach-ConfiguIndex parameter specifies a PRACH configuration and a preamble format. A prach-FreqOffset parameter indicates a frequency position at which an RACH preamble will be transmitted. A rootSequenceIndex parameter indicates a root ZC sequence. A zeroCorrelationZoneConfig parameter indicates a cyclic shift value $N_{CS}$.

3.6 Multiple Timing Advances (TAs) for CA

Figure 10:
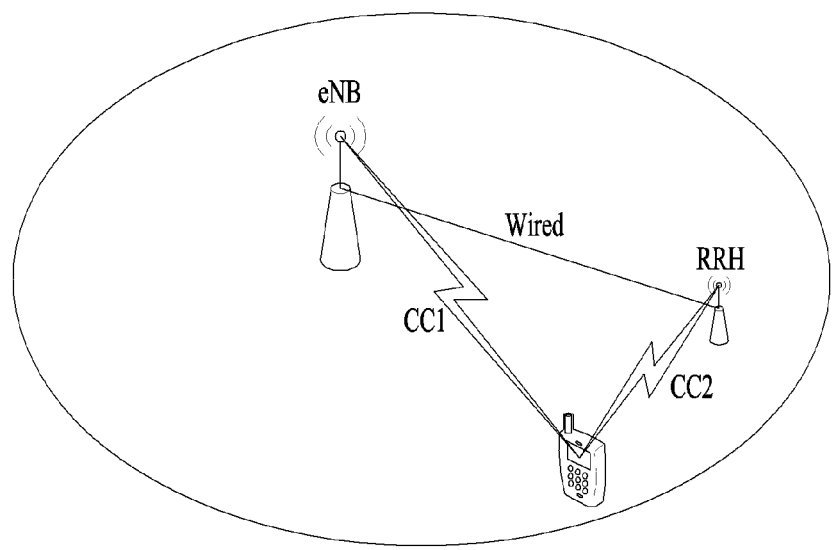
FIG. 10 illustrates aggregation of two or more carriers that are at geographically different locations according to an embodiment of the present invention.

FIG. 10 illustrates aggregation of two or more carriers at different geographical locations according to an embodiment of the present invention.

In a CA environment of the LTE-A system in which a plurality of Component Carriers (CCs) (i.e. cells) are aggregated, a TA value applicable to a specific CC (e.g., a PCC or PCell) may be applied commonly to a plurality of CCs configured in the same eNB. However, this is possible when the plurality of aggregated carriers are at the same geographical location.

On the other hand, it may occur in the future that a UE aggregates a plurality of different CCs in different frequency bands (i.e., much spaced from each other in the frequency domain) or having different propagation characteristics. In the case of a specific CC, repeaters such as a Remote Radio Header (RRH), a small cell, a pico cell, etc. may be deployed in a cell or at a cell boundary in order to extend coverage or remove a coverage hole. In other words, CA is applicable even to a case in which a plurality of carriers at different geographical locations are aggregated.

In this case, however, if a UE transmits UL data according to the method for applying one TA value commonly to all aggregated CCs, the UL transmission may adversely affect synchronization of UL signals transmitted in the plurality of CCs.

Referring to FIG. 10, the UE communicates with an eNB and an RRH using two aggregated CCs. For example, the UE communicates with the eNB directly in one CC, CC1 and with the eNB via the RRH in the other CC, CC2.

Then, the propagation delay (or reception timing at the eNB) of a UL signal transmitted in CC1 by the UE may be different from the propagation delay of a UL signal transmitted in CC2 by the UE due to the location of the UE, frequency characteristics, etc. If a plurality of CCs have different propagation delays as in this case, the eNB and the UE should use a plurality of TAs.

Figure 11:
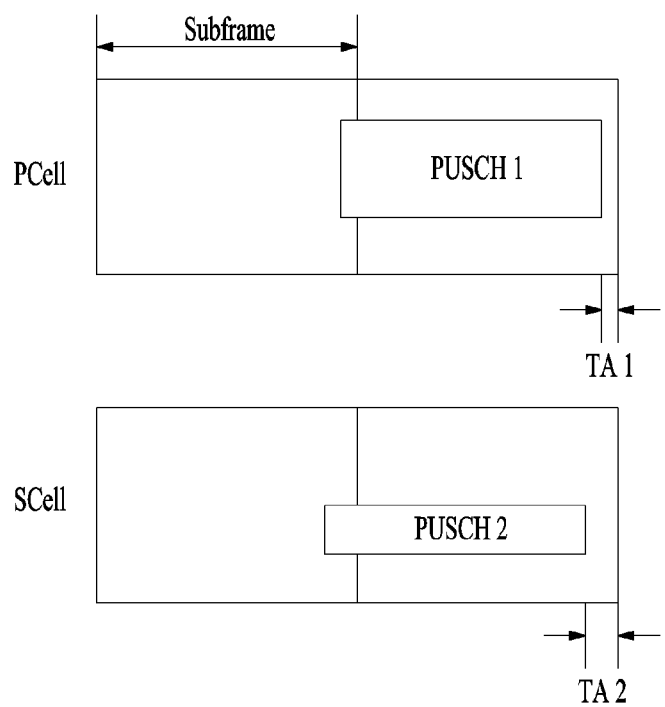
FIG. 11 illustrates transmission of UL data with different Timing Advances (TAs) in a Carrier Aggregation (CA) environment in which two Carrier Components (CCs) are aggregated according to an embodiment of the present invention.

FIG. 11 illustrates transmission of UL data with different TAs in a CA environment in which two CCs are aggregated according to an embodiment of the present invention.

FIG. 11(a) illustrates transmission of UL data (e.g., a PUSCH1 signal) in a PCell and FIG. 11(b) illustrates transmission of UL data (e.g., a PUSCH2 signal) in a SCell. A UE may apply different TAs, TA1 and TA2 in transmitting UL signals in the two CCs.

In a wireless access system according to the present invention, a TA may be allocated independently on a CC group basis, a CC group having one or more CCs. This may be referred to as a TA Group (TAG). That is, one TA is applied commonly to all CCs of one TAG. A TA may be determined based on a PCC for a TAG having the PCC, or a TA adjusted through a random access procedure in the PCC may be applied to the whole TAG.

On the other hand, for a TAG having only an SCC(s), a TA determined based on a specific SCC (e.g., a leader SCell) of the TAG may be applied to the whole TAG. For this purpose, it is preferred to also perform a random access procedure through an SCC, compared to the legacy LTE/LTE-A system. In this case, the random access procedure performed in a SCC may be the contention-based or contention-free random access procedure described in FIG. 7 or 8.

Now, a description will be given of methods for acquiring UL synchronization with two or more CCs, when a CA operation is performed in geographically spaced CCs.

4. Method for Acquiring Secondary Cells and Uplink Synchronization in a CA Environment It is general that existing cells which perform carrier aggregation (CA) are based on several cells of one physical location. However, attempts to increase data processing amount, extend cell coverage and improve use experience of a user have been made by arrangement of a plurality of small cells and/or RRHs. Therefore, the need of CA for a plurality of cells which are physically arranged at different locations has been issued.

The cells are categorized into a P cell group that includes a P cell and an S cell group that does not include a P cell. Each cell group has a size of 1 or more. Since the S cell group does not include a P cell, a leader S cell (L-SCell: Leader-SCell), which performs the role of the P cell on behalf of S cells, may be designated.

The user equipment and/or the base station may perform S cell addition procedure for adding S cell for CA operation and S cell activation procedure for actual data transmission by activating the added S cell.

Also, the user equipment and/or the base station may perform S cell modification procedure for modifying configuration of S cells, S cell deletion procedure for deleting configuration of S cells, and/or S cell deactivation procedure for stopping data transmission and reception through S cell. The S cell addition/deletion/modification procedures may be performed through RRC signaling, and the S cell activation/deactivation procedures may be performed through MAC message.

If S cells which are not physically at the same location as one another are added, a timing advance (TA) value of the S cells may be different from a TA value of the P cell. Therefore, the user equipment may perform a random access procedure with the S cells to acquire a TA value of S cell which will newly be added.

In the embodiments of the present invention, it is assumed that the base station (macro base station or first base station) includes one or more P cells and one or more S cells and RRH or small cell (second base station) includes one or more S cells. Also, if the base station is operated in the P cell, for convenience of description, the base station will be referred to as the P cell. If the base station, RRH or small cell is operated as S cell, for convenience of description, the base station, RRH or small cell will be referred to as the S cell.

If the user equipment performs a RACH procedure with the base station (for example, P cell), RRC connection with the corresponding base station is configured. At this time, the base station (that is, P cell) manages mobility of the user equipment. However, if the user equipment performs a RACH procedure with another S cell in a state that RRC connection with the P cell is configured, the user equipment does not expect RRC role for control of mobility from the S cell. In particular, in view of dual connectivity where the P cell is spaced apart from the S cell, mobility management of the user equipment is performed by the P cell, and data transmission is performed by the S cell.

However, since the cell added as the S cell performs the RACH procedure with the user equipment, the corresponding cell may be operated as the P cell. Therefore, if the cells geographically spaced apart from each other are added in CA as the S cells, it is necessary to notify that the corresponding cell is the S cell not the P cell that controls mobility of the user equipment.

Hereinafter, methods for performing a random access procedure to allow a user equipment to acquire uplink synchronization with S cell which will be added and methods for transmitting S cell indication information to the S cell which will be added will be described.

Figure 12:
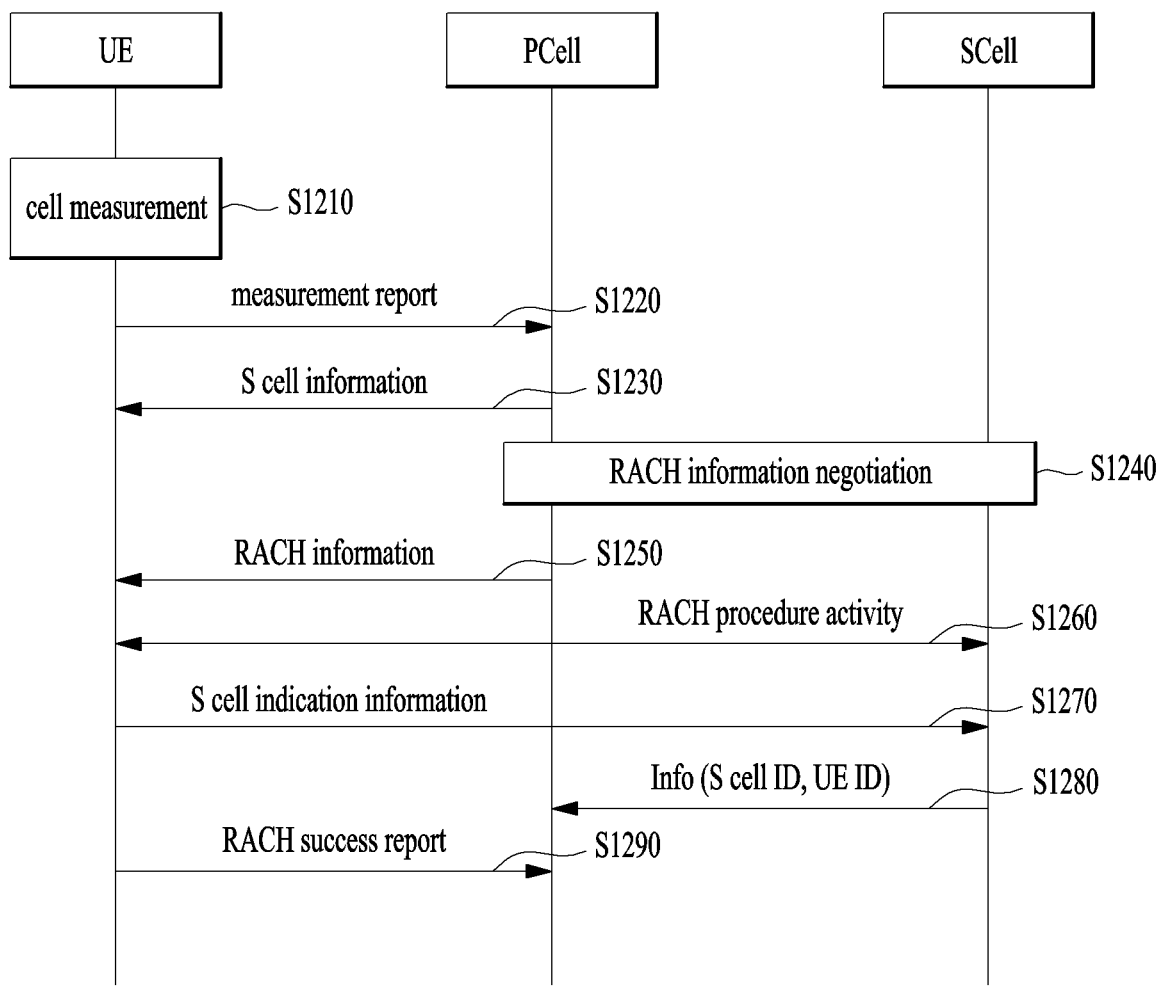
FIG. 12 is a diagram illustrating one of methods for performing a random access procedure to add S cells geographically spaced apart from one another to CA in accordance with an embodiment of the present invention.

FIG. 12 is a diagram illustrating one of methods for performing a random access procedure to add S cells geographically spaced apart from one another to CA in accordance with an embodiment of the present invention.

In FIG. 12, the user equipment UE is connected with the first base station and performs communication through a P cell of the first base station. In the embodiments of the present invention, it is assumed that the first base station is a P cell for convenience. At this time, it is required that the second base station geographically spaced apart from the first base station should be added as the S cell to extend cell coverage of the first base station, increase the processing amount, and/or improve user environment of the user equipment. Therefore, it is assumed that the second base station is an S cell for convenience.

The user equipment performs a cell measurement procedure for acquiring information on a channel status of neighbor cells to add cells (S1210).

The user equipment that has performed the cell measurement procedure transmits a measurement report message, which includes the result of measurement for the neighbor cells, to the base station (S1220).

The P cell that has received the measurement report message from the user equipment may transmit a cell addition command message, which includes S cell information on one or more S cells which will be able to be added, to the user equipment. At this time, the S cell information may include one or more information of a cell identifier for a target cell (that is, S cell) where the user equipment will perform the RACH procedure, action frequency of the S cell and a list of candidate S cells (S1230).

Also, the P cell may previously acquire RACH information which will be used during the RACH procedure to be performed in the S cell through a backbone network (for example, X2 interface) and information on S cell which will be added, based on the measurement report from the user equipment. At this time, the RACH information includes information on RACH resource region where the RACH procedure will be performed and/or information on RACH parameters required to generate RACH preamble (see sections 3.3 to 3.5). If the P cell intends to add two or more S cells to CA, the P cell may previously negotiate RACH information with the two or more S cells and acquire the RACH information (S1240).

Afterwards, the P cell may transmit a PDCCH signal, MAC message or RRC signal, which includes RACH information on one or more S cells which will be added, to the user equipment (S1250).

The user equipment may perform the RACH procedure with the S cell by using the RACH information transferred from the P cell. At this time, the RACH procedure may be understood with reference to the RACH procedure described with reference to FIG. 7 or FIG. 8 (S1260).

That is, the user equipment may quickly perform the RACH procedure with the S cell by previously acquiring the RACH information of the S cell from the P cell even without receiving BCH signals and SIB2 information for acquiring system information from the S cell.

After successfully performing the RACH procedure, the user equipment may transmit S cell indication information to the S cell within a specific time, wherein the S cell indication information indicates that the corresponding S cell is comprised of S cell of CA configured in the user equipment. At this time, the S cell indication information may be transmitted through a bandwidth request (BR) message or a scheduling request (SR) message. Also, the S cell indication information may include P cell information (for example, P cell identifier, etc.) (S1270).

The S cell that has received the S cell indication information from the user equipment may recognize that it is the S cell of CA configured in the user equipment. Therefore, the S cell may transmit a message, which includes cell identifier of the S cell and user identifier information, to the base station through a backbone network to notify that the S cell is operated as the S cell of the corresponding CA (S1280).

If the P cell receives the message, which includes cell identifier of the S cell and user equipment identifier information, from the S cell as the step S1270, the P cell may recognize that the corresponding cell is the S cell added to CA. Therefore, the P cell may schedule the S cell to transmit and receive data to and from the user equipment through the corresponding S cell afterward.

After performing the RACH procedure for the S cell indicated by the P cell, the user equipment reports success or failure of the RACH procedure to the P cell (S1290).

Afterwards, since the P cell and the S cell are grouped by CA, the user equipment may receive radio resource allocation information of the S cell geographically spaced apart from the P cell. Therefore, the S cell may transmit and receive data in accordance with the radio resource allocation information.

In another aspect of the present invention, the steps S1230 and S1250 in FIG. 12 may be performed as one step. In this case, after the step S1220 is performed, the P cell may transmit PDCCH signal/MAC message/RRC signaling, which include S cell information and RACH information, to the user equipment after performing the RACH negotiation procedure with the S cells which will be added.

Figure 13:
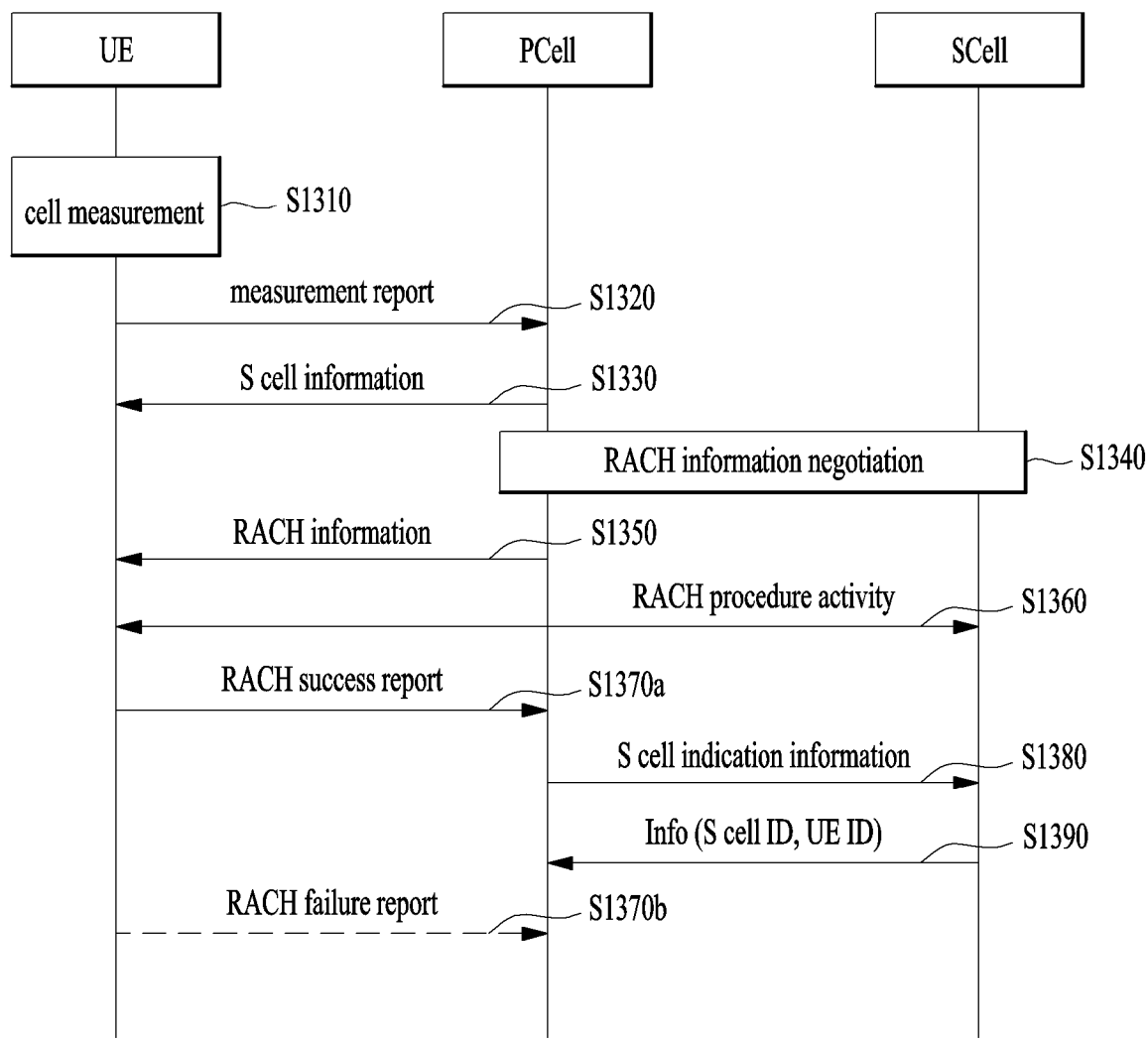
FIG. 13 is a diagram illustrating another one of methods for performing a random access procedure to add S cells geographically spaced apart from one another to CA in accordance with an embodiment of the present invention.

FIG. 13 is a diagram illustrating another one of methods for performing a random access procedure to add S cells geographically spaced apart from one another to CA in accordance with an embodiment of the present invention.

Basic assumption of FIG. 13 is the same as that of FIG. 12. Also, steps S1310 to S1360 of FIG. 13 are the same as the steps S1210 to S1260 of FIG. 12. Therefore, steps of FIG. 13, which are different from those of FIG. 12, will be described in detail.

After successfully performing the RACH procedure, the user equipment transmits an RACH success report message to the P cell within a specific time, wherein the RACH success report message is to notify that the RACH procedure with the S cell has been performed successfully. At this time, the RACH success report message may include information (for example, S cell identifier, etc.) of the S cell that has performed RACH (S1370a).

After receiving the RACH success report message from the user equipment, the P cell may transmit S cell indication information indicating that the corresponding cell is added to S cell of CA. At this time, the S cell indication information may include P cell information that includes P cell identifier and UE information that includes UE identifier (S1380).

The S cell that has received the S cell indication information from the P cell may recognize that the S cell is the cell of the CA configured in the P cell. Therefore, the S cell may transmit a message, which includes a cell identifier of the S cell and UE identifier information, to the P cell through a backbone network to allow the P cell to identify that the S cell is operated as S cell of the corresponding CA (S1390).

Afterwards, since the P cell and the S cell are grouped in CA, the user equipment may receive radio resource allocation information of the S cell geographically spaced apart from the P cell. Therefore, the user equipment may transmit and receive data to and from the S cell in accordance with the radio resource allocation information.

If the RACH procedure of the step S1340 is failed, the user equipment may transmit a RACH failure report message to the P cell instead of the RACH success report message.

Figure 14:
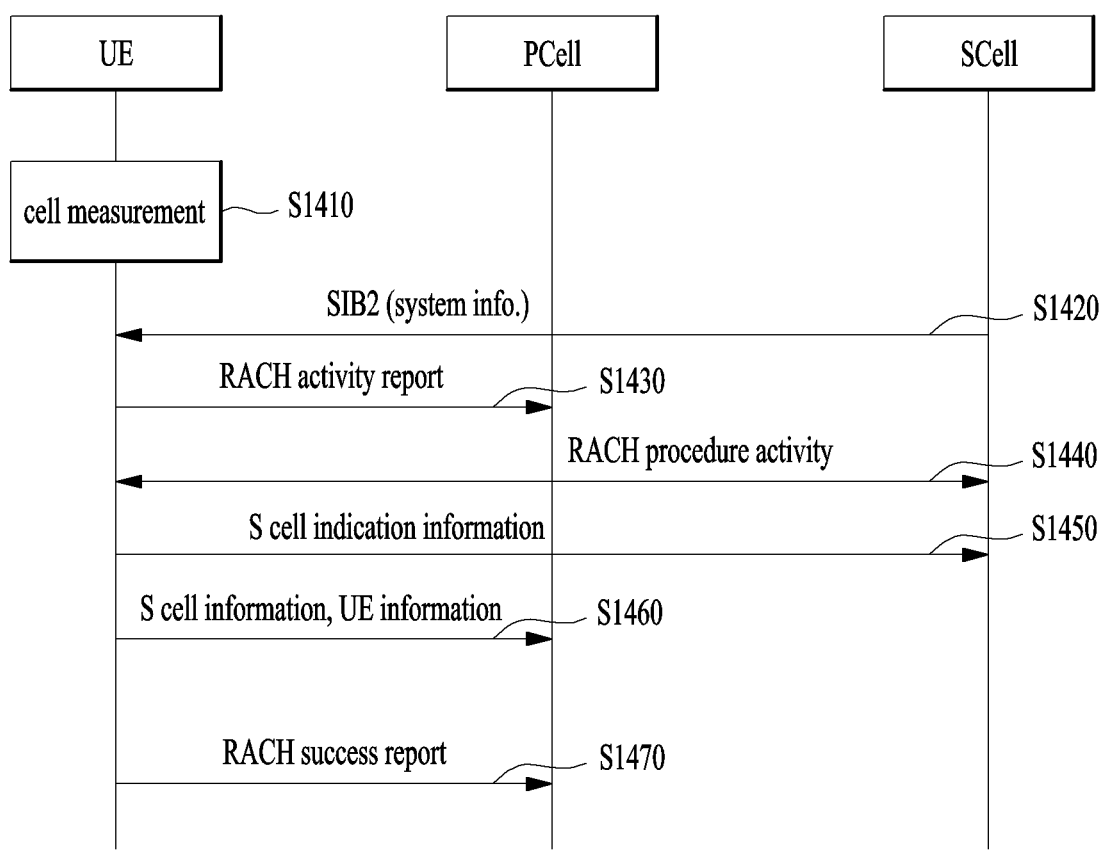
FIG. 14 is a diagram illustrating other one of methods for performing a random access procedure to add S cells geographically spaced apart from one another to CA in accordance with an embodiment of the present invention.

FIG. 14 is a diagram illustrating other one of methods for performing a random access procedure to add S cells geographically spaced apart from one another to CA in accordance with an embodiment of the present invention.

In FIG. 14, the user equipment UE is connected with a first base station and performs communication through P cell of the first base station. In the embodiments of the present invention, for convenience, it is assumed that the first base station is a P cell. At this time, to extend cell coverage of the first base station, increase the processing amount, and/or improve a user environment of the UE, it is required that a second base station geographically spaced apart from the first base station should be added as the S cell. Hereinafter, it is assumed that the second base station is the S cell.

The user equipment performs a cell measurement procedure for acquiring information on a channel status of neighbor cells to add a cell (S1410).

The user equipment selects a suitable S cell of S cell candidates for performing CA based on the cell measurement result of the step S1410. Also, the user equipment acquires RACH parameters (see sections 3.3 to 3.5) by receiving system information (for example, SIB2) from the selected S cell. At this time, the system information includes RACH parameters required to perform the RACH procedure (S1420).

The user equipment transmits a RACH activity report message to the P cell to notify that the RACH procedure with the corresponding S cell has been initiated. At this time, the RACH activity report message may include information (for example, cell identifier) of the S cell that has preformed RACH (S1430).

The user equipment generates RACH preamble by using the RACH parameters acquired at the step S1420. Afterwards, the user equipment performs the RACH procedure with the S cell. The RACH procedure will be described in detail with reference to FIGS. 7 and 8 (S1440).

After successfully performing the RACH procedure, the user equipment may transmit S cell indication information to the S cell within a specific time, wherein the S cell indication information indicates that the user equipment assumes the corresponding S cell as S cell of CA configured by the user equipment. At this time, the S cell indication information may be transmitted through a bandwidth request (BR) message or a scheduling request (SR) message. Also, the S cell indication information may include P cell information (for example, P cell identifier, etc.) (S1450).

Afterwards, the user equipment transfers S cell information on the S cell and UE information to the P cell (S1460).

If the P cell receives the message, which includes a cell identifier of the S cell and UE identifier information, from the user equipment at the step S1460, the P cell may recognize that the corresponding cell is the S cell added to the CA. Therefore, the P cell may schedule the S cell to later transmit and receive data to and from the user equipment through the corresponding S cell.

After performing the RACH procedure for the S cell indicated from the P cell, the user equipment reports success or failure of the RACH procedure to the P cell (S1470).

Afterwards, since the P cell and the S cell are grouped in CA, the user equipment may receive radio resource allocation information of the S cell geographically spaced apart from the P cell. Therefore, the user equipment may transmit and receive data to and from the S cell in accordance with the radio resource allocation information.

In the embodiments described with reference to FIGS. 12 to 14, the user equipment or the P cell has transmitted the S cell indication information to the corresponding S cell after performing the RACH procedure. However, in another aspect of the present invention, the S cell indication information may be transmitted to the S cell at the step S1250, S1350 or S1440. For example, the user equipment may transmit the S cell indication information to the S cell through a first message (for example, RACH preamble) or a third message (for example, uplink signaling) during the RACH procedure.

5. Apparatuses

Figure 15:
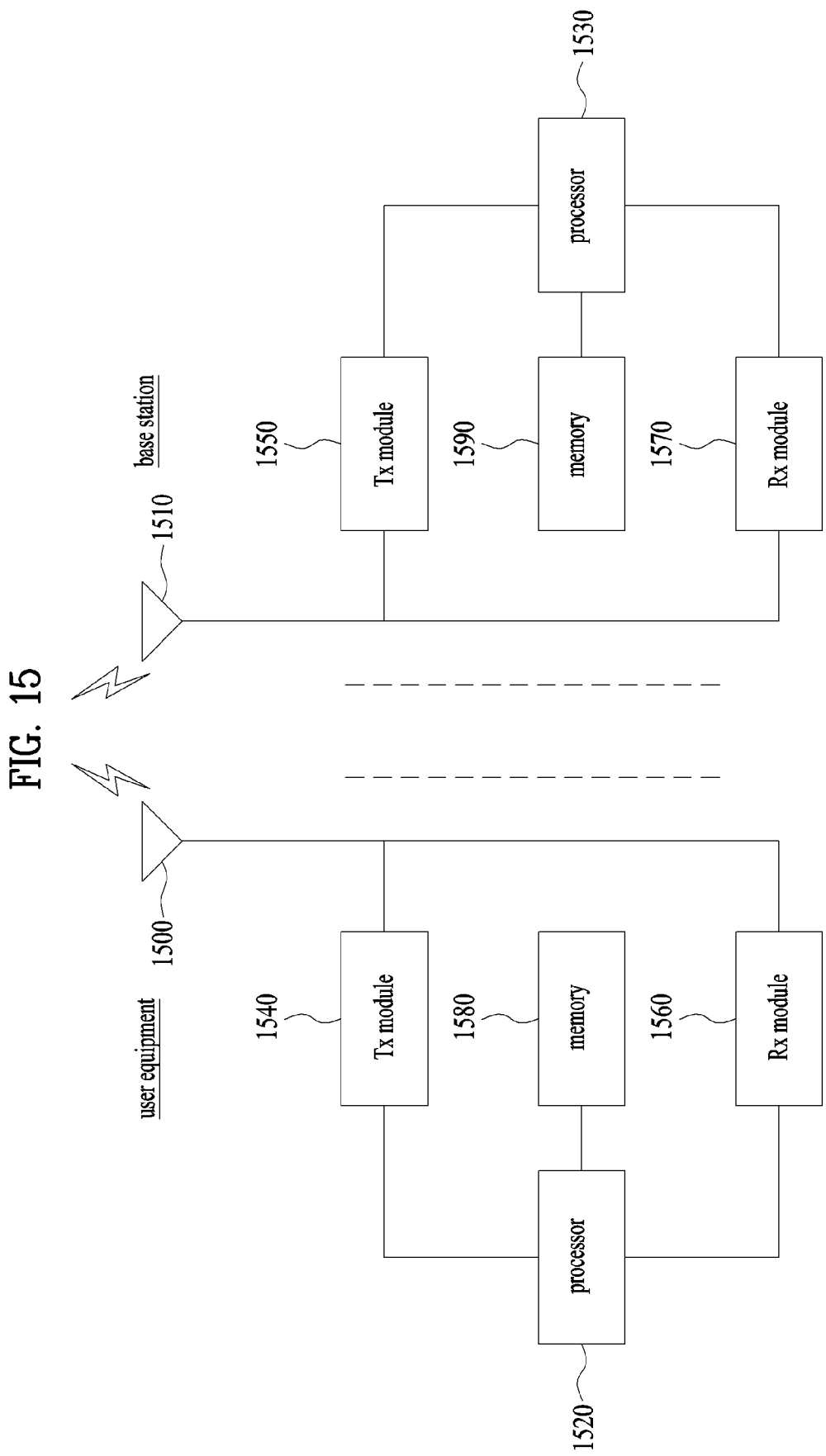
FIG. 15 is a diagram illustrating an apparatus through which descriptions made in FIGS. 1 to 14 may be implemented.

Apparatuses illustrated in FIG. 15 are means that can implement the methods described before with reference to FIGS. 1 to 14.

A UE may act as a transmitter on a UL and as a receiver on a DL. A BS may act as a receiver on a UL and as a transmitter on a DL.

That is, each of the UE and the BS may include a Transmission (Tx) module 1540 or 1550 and a Reception (Rx) module 1560 or 1570, for controlling transmission and reception of information, data, and/or messages, and an antenna 1500 or 1510 for transmitting and receiving information, data, and/or messages.

Each of the UE and the BS may further include a processor 1520 or 1530 for implementing the afore-described embodiments of the present invention and a memory 1580 or 1590 for temporarily or permanently storing operations of the processor 1520 or 1730.

The embodiments of the present invention may be performed using the aforementioned elements and functions of the user equipment and the base station. For example, the processor of each of the base station and the user equipment may perform the operation for adding the serving cell geographically spaced to CA and the operations for acquiring uplink synchronization from the corresponding serving cells if the serving cells geographically spaced configure CA by combination of the methods described in the sections 1 to 4. Also, the user equipment and/or the base station (that is, P cell) may transmit the S cell indication information to the S cell, wherein the S cell indication information is to indicate that the cell to be added to the CA is the S cell. The detailed description will be understood with reference to the section 4.

The Tx and Rx modules of the UE and the BS may perform a packet modulation/demodulation function for data transmission, a high-speed packet channel coding function, OFDMA packet scheduling, TDD packet scheduling, and/or channelization. Each of the UE and the BS of FIG. 15 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing the above-described functions or operations. A software code may be stored in the memory 1580 or 1590 and executed by the processor 1520 or 1530. The memory is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

Embodiments of the present invention are applicable to various wireless access systems including a 3GPP system, a 3GPP2 system, and/or an IEEE 802.xx system. In addition to these wireless access systems, the embodiments of the present invention are applicable to all technical fields in which the wireless access systems find their applications.

The invention claimed is:

1. A method for enabling a user equipment to add a secondary (S) cell to a carrier aggregation (CA) in a radio access system that supports the CA, the method comprising:
   receiving S cell information from a primary (P) cell of a first base station, the S cell information including random access channel (RACH) information related to a random access procedure which will be performed in a second base station to be added to the CA and a cell identifier of the second base station;
   performing the random access procedure for uplink synchronization based on the S cell information in the second base station; and
   transmitting S cell indication information to the second base station,
   wherein the S cell indication information indicates that the second base station is the S cell,
   wherein the S cell indication information includes a cell identifier of the first base station, and
   wherein the RACH information includes resource allocation information indicating a resource region of the second base station in which the random access procedure will be performed, and RACH parameters required to generate a RACH preamble which will be used for the random access procedure.

2. The method according to claim 1, wherein the second base station is located at a place geographically spaced apart from the first base station.

3. The method according to claim 1, wherein the S cell indication information is transmitted through a scheduling request message.

4. The method according to claim 1, further comprising:
performing a cell measurement for measuring a channel status on neighbor cells; and
transmitting a measurement report message to the first base station to report the result of the cell measurement.

5. A user equipment for adding a secondary (S) cell to a carrier aggregation (CA) in a radio access system that supports the CA, the user equipment comprising:
a transmitter;
a receiver; and
a processor configured to support addition of the S cell, wherein the processor is further configured to:
control the receiver to receive S cell information from a primary (P) cell of a first base station,
wherein the S cell information includes random access channel (RACH) information related to a random access procedure which will be performed in a second base station to be added to the CA and a cell identifier of the second base station,
control the transmitter and the receiver to perform the random access procedure for uplink synchronization based on the S cell information in the second base station, and
control the transmitter to transmit S cell indication information to the second base station,
wherein the S cell indication information indicates that the second base station is the S cell,
wherein the S cell indication information includes a cell identifier of the first base station, and
wherein the RACH information includes resource allocation information indicating a resource region of the second base station in which the random access procedure will be performed, and RACH parameters required to generate a RACH preamble which will be used in the random access procedure.

6. The user equipment according to claim 5, wherein the second base station is located at a place geographically spaced apart from the first base station.

7. The user equipment according to claim 5, wherein the S cell indication information is transmitted through a scheduling request message.

8. The user equipment according to claim 5, wherein the processor measures a channel status on neighbor cells by controlling the receiver, and controls the transmitter to transmit a measurement report message to the first base station to report the result of the cell measurement.

9. A method for enabling a first base station to add a secondary (S) cell to a carrier aggregation (CA) in a radio access system that supports the CA, the method is performed by a first base station and comprising:
acquiring random access channel (RACH) information related to a random access procedure which will be performed by a second base station;
transmitting S cell information to a user equipment,
wherein the S cell information includes a cell identifier of the second base station and the RACH information; and
receiving a RACH status report message from the user equipment,
wherein the RACH status report message indicates that the random access procedure with the second base station has failed, and
wherein the RACH information includes resource allocation information indicating a resource region of the second base station in which the random access procedure will be performed, and RACH parameters required to generate a RACH preamble which will be used for the random access procedure.

10. The method according to claim 9, wherein the second base station is located at a place geographically spaced apart from the first base station.

11. A first base station for adding a secondary (S) cell to a carrier aggregation (CA) in a radio access system that supports the CA, the first base station comprising:
a transmitter;
a receiver; and
a processor configured to support addition of the S cell, wherein the processor is further configured to:
acquire random access channel (RACH) information related to a random access procedure which will be performed by a second base station,
control the transmitter to transmit S cell information to a user equipment,
wherein the S cell information includes a cell identifier of the second base station and the RACH information,
control the receiver to receive an RACH status report message from the user equipment,
wherein the RACH status report message indicates that the random access procedure with the second base station has failed, and
wherein the RACH information includes resource allocation information indicating a resource region of the second base station in which the random access procedure will be performed, and RACH parameters required to generate a RACH preamble which will be used for the random access procedure.

12. The first base station according to claim 11, wherein the second base station is located at a place geographically spaced apart from the first base station.

* * * * *